(12) United States Patent
Shibazaki

(10) Patent No.: US 11,969,822 B2
(45) Date of Patent: Apr. 30, 2024

(54) PROCESSING METHOD AND PROCESSING SYSTEM

(71) Applicant: NIKON CORPORATION, Tokyo (JP)

(72) Inventor: Yuichi Shibazaki, Kumagaya (JP)

(73) Assignee: NIKON CORPORATION, Tokyo (JP)

( * ) Notice: Subject to any disclaimer, the term of this patent is extended or adjusted under 35 U.S.C. 154(b) by 330 days.

(21) Appl. No.: 16/587,841

(22) Filed: Sep. 30, 2019

(65) Prior Publication Data

US 2020/0101564 A1 Apr. 2, 2020

Related U.S. Application Data

(63) Continuation of application No. PCT/JP2018/012480, filed on Mar. 27, 2018.

(30) Foreign Application Priority Data

Mar. 31, 2017 (JP) .................................. 2017-069730

(51) Int. Cl.
*B23K 26/08* (2014.01)
*B33Y 30/00* (2015.01)
(Continued)

(52) U.S. Cl.
CPC .............. *B23K 26/08* (2013.01); *B22F 10/25* (2021.01); *B22F 12/20* (2021.01); *B22F 12/70* (2021.01); *B23K 26/146* (2015.10); *B23K 26/1464* (2013.01); *B23K 26/16* (2013.01); *B23K 26/342* (2015.10); *B23K 26/703* (2015.10); *B33Y 10/00* (2014.12); *B33Y 30/00* (2014.12);
(Continued)

(58) Field of Classification Search
USPC ...................................................... 219/76.11
See application file for complete search history.

(56) References Cited

U.S. PATENT DOCUMENTS

2003/0206820 A1 11/2003 Keicher et al.
2006/0092990 A1* 5/2006 Koga ..................... B23K 26/04
372/7
(Continued)

FOREIGN PATENT DOCUMENTS

CN 101474721 A 7/2009
CN 202291850 U 7/2012
(Continued)

OTHER PUBLICATIONS

Translation of JP-03146286-A (Year: 1991).*
(Continued)

*Primary Examiner* — Elizabeth M Kerr
(74) *Attorney, Agent, or Firm* — Oliff PLC

(57) ABSTRACT

The processing system is provided with: a liquid supply device which can supply a liquid; a liquid processing device which processes a liquid supplied from the liquid supply device such that a non-liquid-immersion state is generated locally in a partial area including a target portion on a predetermined surface; a beam irradiation section which emits beams toward the target portion; and a moving apparatus which moves the predetermined surface. The beams are irradiated on the target portion to apply a predetermined processing to the target portion, in a state in which the target portion is in the non-liquid-immersion state.

38 Claims, 12 Drawing Sheets

(51) Int. Cl.
  *B33Y 50/02* (2015.01)
  *B23K 26/342* (2014.01)
  *B23K 26/70* (2014.01)
  *B23K 26/14* (2014.01)
  *B23K 26/16* (2006.01)
  *B33Y 10/00* (2015.01)
  *B23K 26/146* (2014.01)
  *B22F 10/25* (2021.01)
  *B22F 12/20* (2021.01)
  *B22F 12/70* (2021.01)
  *B22F 12/44* (2021.01)
  *B22F 10/32* (2021.01)

(52) U.S. Cl.
  CPC ............ *B33Y 50/02* (2014.12); *B22F 10/32* (2021.01); *B22F 12/44* (2021.01)

(56) References Cited

U.S. PATENT DOCUMENTS

| | | | |
|---|---|---|---|
| 2008/0030852 A1 | 2/2008 | Shigematsu | |
| 2012/0105867 A1 | 5/2012 | Komatsu | |
| 2015/0064047 A1 | 3/2015 | Hyde et al. | |
| 2015/0239065 A1* | 8/2015 | Nomura | B23P 6/04 |
| | | | 219/121.84 |
| 2017/0017067 A1* | 1/2017 | Ohno | B22F 12/44 |
| 2017/0120517 A1* | 5/2017 | Shimoyama | B05B 14/10 |
| 2017/0304946 A1 | 10/2017 | Shibazaki | |
| 2017/0304947 A1 | 10/2017 | Shibazaki | |

FOREIGN PATENT DOCUMENTS

| | | | |
|---|---|---|---|
| DE | 11 2014 006 481 T5 | | 12/2016 |
| DE | 11 2014 006 482 T5 | | 12/2016 |
| EP | 3 069 816 A2 | | 9/2016 |
| EP | 3069816 A2 * | | 9/2016 ............ B22F 3/1055 |
| EP | 3 219 411 A1 | | 9/2017 |
| EP | 3 219 412 A1 | | 9/2017 |
| JP | S63-083221 A | | 4/1988 |
| JP | 03146286 A * | | 6/1991 |
| JP | H06-155587 A | | 6/1994 |
| JP | H11-324906 A | | 11/1999 |
| JP | 2000-288751 A | | 10/2000 |
| JP | 2000288751 A * | | 10/2000 |
| JP | 2005-267746 A | | 9/2005 |
| JP | 2008-296263 A | | 12/2008 |
| JP | 2008296263 A * | | 12/2008 |
| JP | 2014-034712 A | | 2/2014 |
| JP | 2015-178191 A | | 10/2015 |
| JP | 2016-535170 A | | 11/2016 |
| WO | 2015/031453 A1 | | 3/2015 |
| WO | 2015/108546 A2 | | 7/2015 |
| WO | 2016/075801 A1 | | 5/2016 |
| WO | 2016/075802 A1 | | 5/2016 |
| WO | 2016/185966 A1 | | 11/2016 |

OTHER PUBLICATIONS

Jan. 15, 2021 extended Search Report issued in European Patent Application No. 18774864.5.
Nov. 1, 15, 2021 Office Action issued in Chinese Patent Application No. 201880030451.6. .
Jun. 29, 2021 Office Action issued in Japanese Patent Application No. 2019-509903.
Sep. 7, 2021 Office Action Issued in Taiwan Patent Application No. 107110869.
Jun. 12, 2018 International Search Report issued in International Patent Application No. PCT/JP2018/012480.
Jun. 12, 2018 Written Opinion of the International Searching Authority issued in International Patent Application No. PCT/JP2018/012480.
May 14, 2021 Office Action issued in Chinese Patent Application No. 201880030451.6.
arch 11, 2022 Office Action issued in Chinese Patent Application No. 201880030451.6.
Jan. 14, 2022 Office Action issued in Japanese Patent Application No. 2019-509903.
Jul. 5, 2022 Office Action issued in Japanese Patent Application No. 2019-509903.
Jul. 25, 2023 Office Action issued in Japanese Patent Application No. 2019-509903.
May 1, 19, 2023 Office Action issued in European Patent Application No. 18774864.5.

* cited by examiner

PROCESSING METHOD AND PROCESSING SYSTEM

CROSS-REFERENCE TO RELATED APPLICATIONS

This application is a continuation of International Application PCT/JP2018/012480, with an international filing date of Mar. 27, 2018, the disclosure of which is hereby incorporated herein by reference in its entirety, which was not published in English.

BACKGROUND OF THE INVENTION

Field of the Invention

The present invention relates to processing methods and processing systems, and more particularly to a processing method and a processing system to apply a predetermined processing to a target portion on a predetermined surface by irradiation of a beam.

Description of the Background Art

As a technique of applying a predetermined processing to a target portion of a processing target by irradiating beams such as a laser beam, for example, a technique is known of generating a 3D (three-dimensional) shape directly from CAD data. This technique is called rapid prototyping (while it may also be called 3D printing, additive manufacturing, or direct digital manufacturing, it will be referred to hereinafter in general as rapid prototyping). Shaping devices that form three-dimensional shaped objects using rapid prototyping such as 3D printers, when being classified by materials to be handled, can be grouped roughly into devices that handle resin and devices that handle metal. The metal three-dimensional shaped object made by rapid prototyping is to be used as a part of an actual machine structure (even if it is a mass produced item or a prototype). As existing metallic 3D printers (hereinafter shortly referred to as a M3DP (Metal 3D Printer)), two types of printers; PBF (Powder Bed Fusion), and DED (Directed Energy Deposition) are well known.

DED employs a method of depositing metal material which is dissolved on a processing subject. For example, powder metal is to be jetted near the focal point of the laser beam condensed by a condensing lens (for example, refer to U.S. Patent Application Publication No. 2003/0206820).

In 3D printers, for example, there is room for improvement so that warp, deformation and the like due to irradiation of beams do not occur in the shaped objects. Similar points of improvement exist also in a laser processing apparatus that performs processing by irradiating a laser beam on a workpiece.

SUMMARY OF THE INVENTION

According to a first aspect of the present invention, there is provided a processing method in which processing is applied to a target portion on a predetermined surface by irradiation of a beam, comprising: supplying a liquid; making a non-liquid-immersion state in a partial area including the target portion on the predetermined surface; and irradiating a beam on the target portion in a state in which the non-liquid-immersion state is generated in the partial area including the target portion, so that the processing is applied to the target portion.

According to a second aspect of the present invention, there is provided a processing method in which processing is applied to a target portion on a predetermined surface by irradiation of a beam, comprising: supplying a liquid; and irradiating a beam on the target portion without the beam going through the liquid supplied so that the processing is applied to the target portion.

According to a third aspect of the present invention, there is provided a processing method in which processing is applied to a target portion on a predetermined surface by irradiation of a beam, comprising: supplying a liquid; performing processing on the liquid supplied so that an optical path of the beam becomes a gas space; and irradiating the beam on the target portion via the gas space, so that the processing is applied to the target portion.

According to a fourth aspect of the present invention, there is provided a processing system which processes a target portion on a predetermined surface by irradiation of a beam, comprising: a liquid supply device which can supply liquid; a liquid processing device which processes liquid supplied from the liquid supply device so that a non-liquid-immersion state is generated locally in a partial area including the target portion on the predetermined surface; a beam irradiation section which emits a beam toward the target portion; and a moving apparatus which moves the predetermined surface, wherein a beam is irradiated on the target portion in a state in which the target portion is in the non-liquid-immersion state, so that processing is applied to the target portion.

According to a fifth aspect of the present invention, there is provided a processing system which processes a target portion on a predetermined surface by irradiation of a beam, comprising: a liquid supply device which can supply liquid; a beam irradiation section which emits a beam toward the target portion; and a moving apparatus which moves the predetermined surface, wherein a beam is irradiated on the target portion without the beam going through the liquid, so that the processing is applied to the target portion.

According to a sixth aspect of the present invention, there is provided a processing system which processes a target portion on a predetermined surface by irradiation of a beam, comprising: a liquid supply device which can supply liquid; a beam irradiation section which emits a beam toward the target portion; and a liquid processing device which processes liquid supplied by the liquid supply device so that an optical path of the beam becomes a gas space, wherein the beam is irradiated on the target portion via the gas space, so that the processing is applied to the target portion.

According to a seventh aspect of the present invention, there is provided a processing system which processes a target portion on a predetermined surface by irradiation of a beam, comprising: a liquid supply device which can supply liquid to an object that has the predetermined surface; a beam irradiation section which emits a beam toward the target portion; and a moving apparatus which moves the predetermined surface.

BRIEF DESCRIPTION OF DRAWINGS

In the accompanying drawings.

DESCRIPTION OF EMBODIMENTS

First Embodiment

Figure 1:
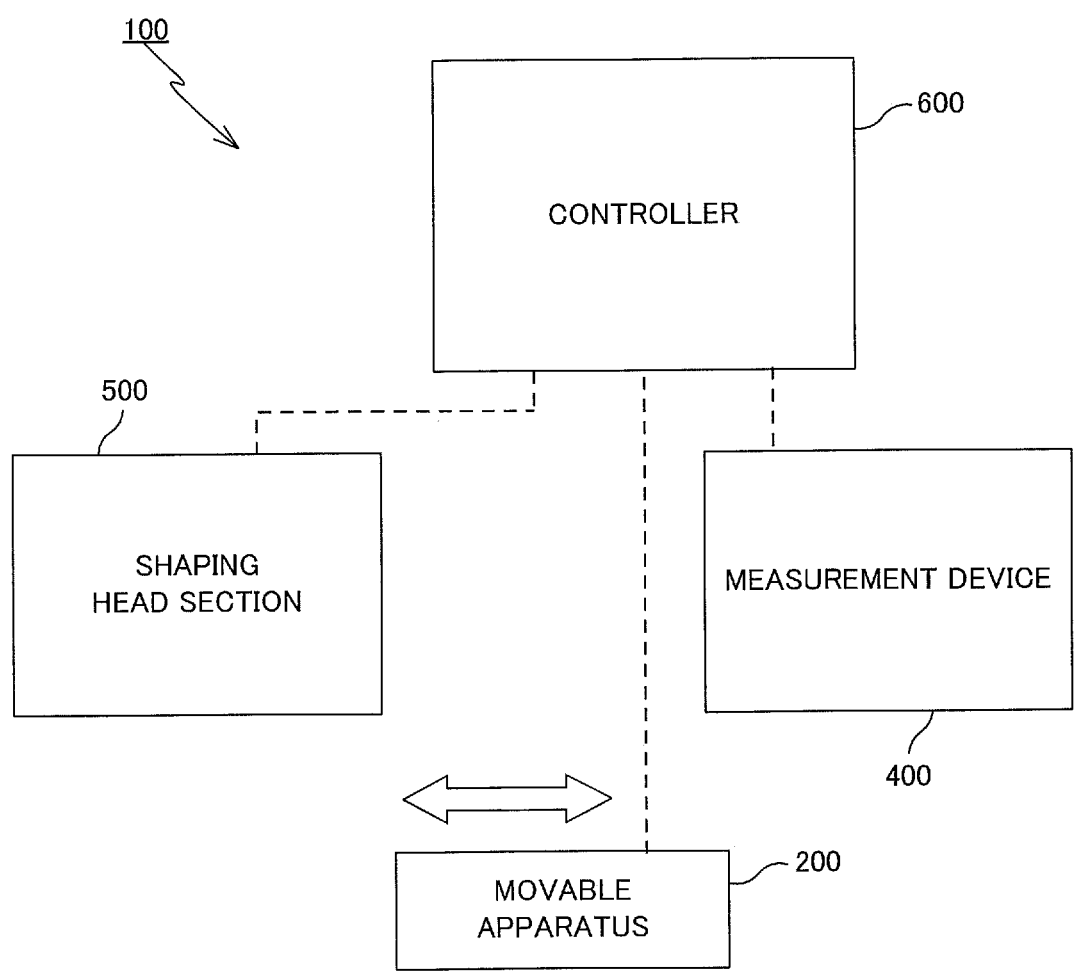
FIG. 1 is a block diagram showing an overall structure of a shaping device according to a first embodiment.

A first embodiment will be described below, based on FIGS. 1 to 6. FIG. 1 shows an overall structure of a shaping system 100 according to the first embodiment.

Shaping system 100 is an M3DP of a DED method. While shaping system 100 can be used to form a three-dimensional shaped object on a stage to be described later on by rapid prototyping, the system can also be used to perform additive manufacturing by three-dimensional shaping on a workpiece (e.g., existing parts). In the embodiment, the latter case will be described centering on performing additive manufacturing on a workpiece.

Shaping system 100 is equipped with a moving apparatus 200, a measurement device 400, a shaping head section 500, and a controller 600 that controls the whole shaping system 100 including each of these parts. Of these parts, measurement device 400 and shaping head section 500 are arranged separately apart in a predetermined direction. In the description below, for convenience, measurement device 400 and shaping head section 500 are to be arranged separately in an X-axis direction to be described later on (refer to FIG. 2).

Figure 2:
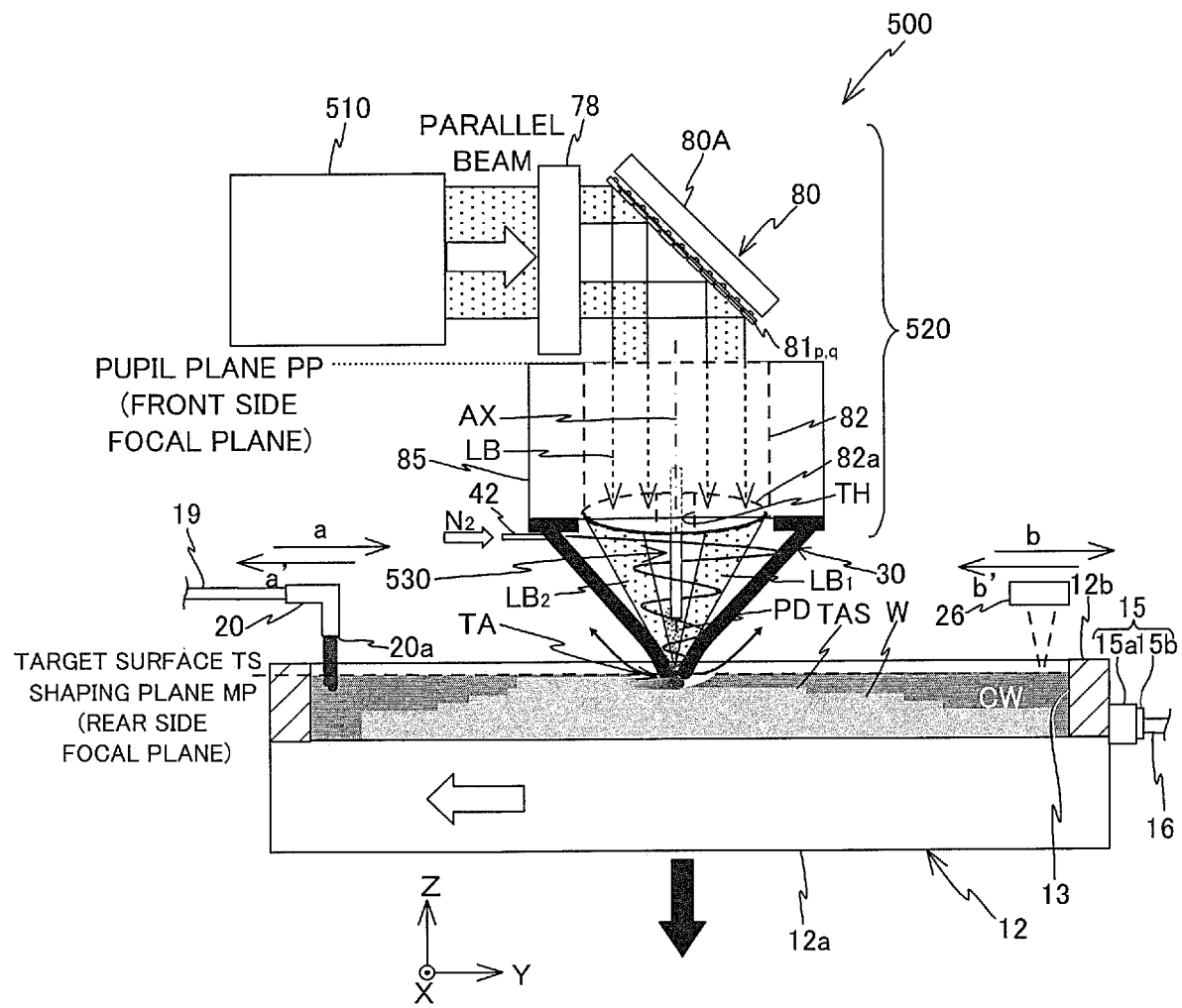
FIG. 2 is a view showing a shaping head section along with a stage on which a workpiece is mounted.

FIG. 2 shows shaping head section 500, along with a stage 12 which structures a part of moving apparatus 200. In FIG. 2, a workpiece W is mounted on a table to be described later on which stage 12 is equipped with. In this description, both a workpiece before additive manufacturing is applied (e.g., existing parts) and a workpiece to which additive manufacturing by three-dimensional shaping has been applied (including a workpiece to which additive manufacturing is being applied) are to be described as workpiece W. Note that in the case additive manufacturing is performed by fixing a shaping member on the table while forming a molten/weld pool on the member, then the member is to serve as workpiece W. FIG. 2 shows a state, in which additive manufacturing is being applied to workpiece W. In the description below, a direction orthogonal to the page surface in FIG. 2 will be referred to as an X-axis direction, a lateral direction of the page surface will be referred to as a Y-axis direction, a direction orthogonal to an X-axis and a Y-axis will be referred to as a Z-axis direction, and rotation (tilt) directions around the X-axis, the Y-axis, and the Z-axis will be referred to as θx, θy, and θz directions, respectively.

Figure 5:
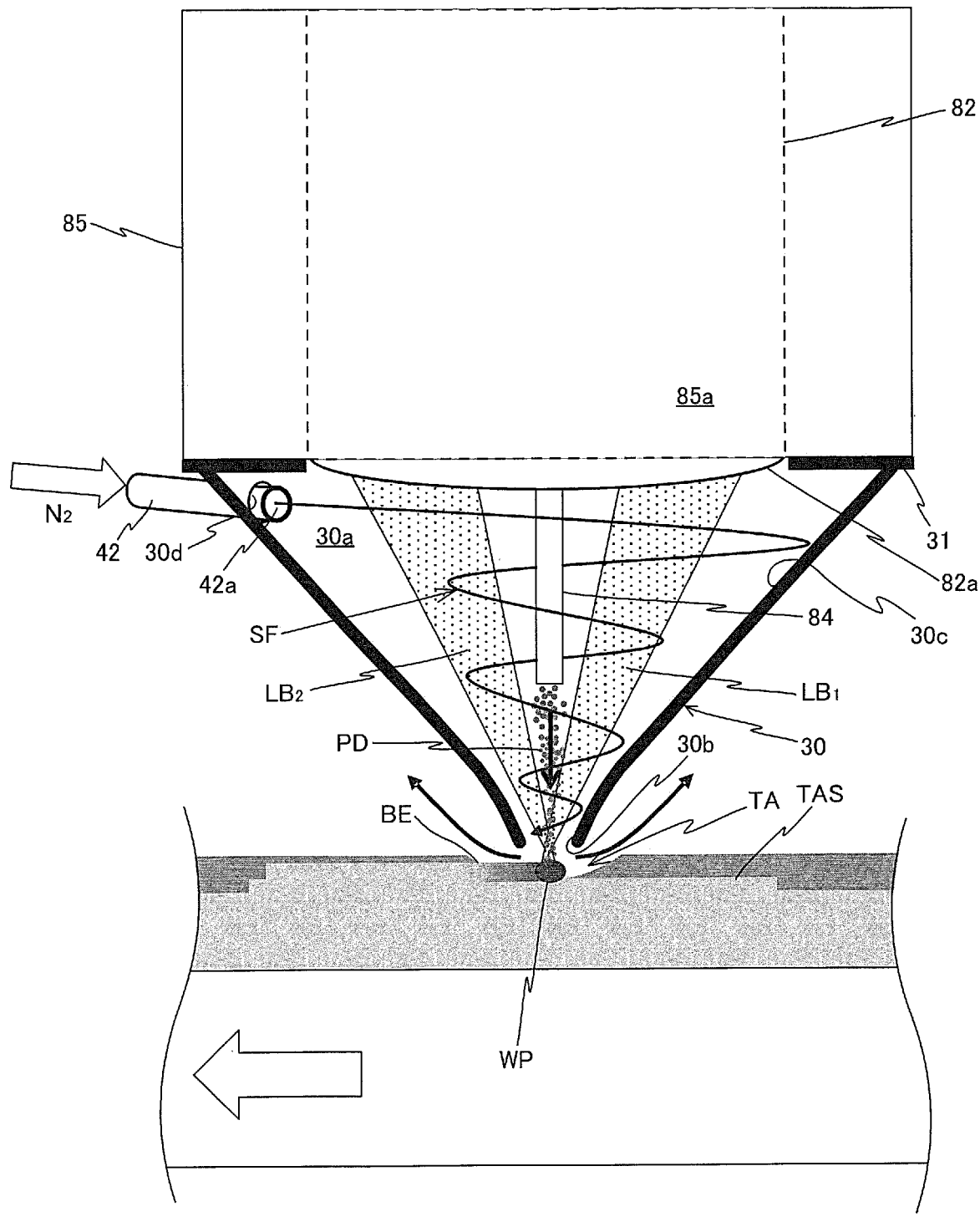
FIG. 5 is a view showing apart of FIG. 2 enlarged, which shows a barrel holding the condensing optical system and a cover member, along with an area around a target portion of a workpiece on a stage.

Moving apparatus 200 changes position and attitude of a shaping object surface (here, a surface where a target portion TA is set on workpiece W) TAS (refer to FIGS. 2 and 5). Specifically, by movable stage 12 on which workpiece W having object surface TAS is mounted in directions of six degrees of freedom (each of the X-axis, the Y-axis, the Z-axis, the θx, the θy, and the θz directions), position change is performed of the object surface in directions of six degrees of freedom. In this description, as for the stage, the workpiece, or the object surface or the like, positions in directions of three degrees of freedom, which are the θx, the θy, and the θz directions, will be collectively called "attitude" as appropriate, and corresponding to this, positions in the remaining directions of three degrees of freedom (the X-axis, the Y-axis, and the Z-axis directions) will be collectively called "position" as appropriate.

Moving apparatus 200 is equipped with stage 12 which can move in directions of six degrees of freedom and a drive mechanism 14 for moving stage 12. The drive mechanism for stage 12 is equipped with an articulated robot which can move freely on a floor surface parallel to an XY plane. In the description below, drive mechanism 14 of stage 12 will also be referred to as a robot 14 (refer to FIG. 6) for convenience. By robot 14, stage 12 can be moved in predetermined strokes in each direction of the X-axis, the Y-axis, and the Z-axis, and can be finely moved in the remaining directions of three degrees of freedom.

Position information onstage 12 in at least directions of six degrees of freedom is obtained (refer to FIG. 6), based on detection information of various sensors (various sensors (referred to as sensor group 17) which detect a rotation angle of a joint, expansion/contraction amount of an arm, and the like) that robot 14 is equipped with. Note that while sensor group 17 is provided at robot 14, in FIG. 6, sensor group 17 is illustrated separately from robot 14 for convenience of explanation.

Note that drive mechanism 14 of stage 12 is not limited to a robot, and stage 12 may have a structure being equipped with a parallel link mechanism in which stage 12 structures an end effector and a planar motor or a linear motor which moves the parallel link mechanism within the XY plane. Also, drive mechanism 14 is not limited to the mechanism which moves stage 12 in directions of six degrees of freedom, as long as stage 12 can be moved at least in the X-axis, the Y-axis, and the Z-axis, in directions of three degrees of freedom.

Stage 12, as is shown in FIG. 2, is equipped with a table 12a which is rectangular in a planar view on which workpiece W is mounted, and a frame member 12b of a predetermined height which is rectangular in a planar view and is fixed to the upper surface of table 12a. Note that workpiece W is fixed on the table, using a chuck member (not shown) consisting of a mechanical chuck, a vacuum chuck or the like.

Frame member 12b is connected to the upper surface of table 12a without any gap, and frame member 12b and the upper surface of table 12 form a tank 13 of a rectangular shape in a planar view in which frame member 12*b* serves as a peripheral wall. Note that table 12*a* and frame member 12*b* may be formed as one member. Also, tank 13 may be called a pool or a reservoir. Tank 13 can store cooling water CW inside. In a part of frame member 12*b* structuring the peripheral wall of tank 13 on the +Y side, a hole (not shown) which penetrates frame member 12*b* in the Y-axis direction is formed, and to the hole a drain pipe 16 is connected via a connector 15. Connector 15 has a first part 15*a* provided at stage 12 and a second part 15*b* provided at one end of drain pipe 16, and the second part 15*b* can be attached to the first part 15*a*. In the embodiment, when stage 12 moves along a predetermined route and reaches a predetermined position near shaping head section 500, the second part 15*b* which is waiting is attached to the first part 15*a* provided at stage 12, and one end of drain pipe 16 is to be connected to tank 13 (stage 12). Note that drain pipe 16 may be connected directly to stage 12, without connector 15 being provided. Also, stage 12 may be moved while drain pipe 16 is being connected to stage 12.

In drain pipe 16, a first flow control valve 18A (not shown in FIG. 2, refer to FIG. 6) is provided that can adjust the flow of liquid flowing in the flow path inside drain pipe 16. Since this first flow control valve 18A can also completely close the flow inside drain pipe 16, the valve also functions as a stop valve. The first flow control valve 18A operates under the control of controller 600.

Near shaping head section 500, an outlet portion 20 is arranged that has a supplying port 20*a* provided at a position of a predetermined height on a side at one end of a water supply pipe 19. Outlet portion 20, as is illustrated in arrows a and a' in FIG. 2, is movable back and forth along a direction perpendicular to the Z-axis (the Y-axis direction in the embodiment) by a first drive section 22A (not shown in FIG. 2, refer to FIG. 6). Note that outlet portion 20 does not have to be movable, or may be movable in other directions (e.g., the Z-axis direction), in addition to the direction perpendicular to the Z-axis, or instead of the direction perpendicular to the Z-axis. To the other end of water supply pipe 19, a cooling water supply device 21 (not shown in FIG. 2, refer to FIG. 6) is connected that includes a liquid tank which stores cooling water inside. Also, in water supply pipe 19, a second flow control valve 18B (refer to FIG. 6) is provided which has a similar function as that of the first flow control valve 18A. The second flow control valve 18B operates under the control of controller 600.

Also, near shaping head section 500, an aerial type ultrasonic water level sensor (hereinafter shortly referred to as a water level sensor) 26 which detects the level (water level) of water surface (liquid surface) of cooling water CW in tank 13 is provided at a position of a predetermined height. This water level sensor 26, to explain this briefly, is a set formed with a speaker, a microphone, and a thermometer, and the sensor calculates the distance to the water surface (liquid surface) from the time of a sound emitted from the speaker, which is reflected by the water surface (liquid surface) and reaches the microphone, and then converts the distance to the water level (liquid level). The thermometer is used to correct (temperature correction) the influence of temperature on sound velocity. Note that the sensor is not limited to the ultrasonic water level sensor, and any type of sensor may be used as long as the sensor can detect the level (water level) of the water surface of the cooling water in tank 13.

Figure 6:
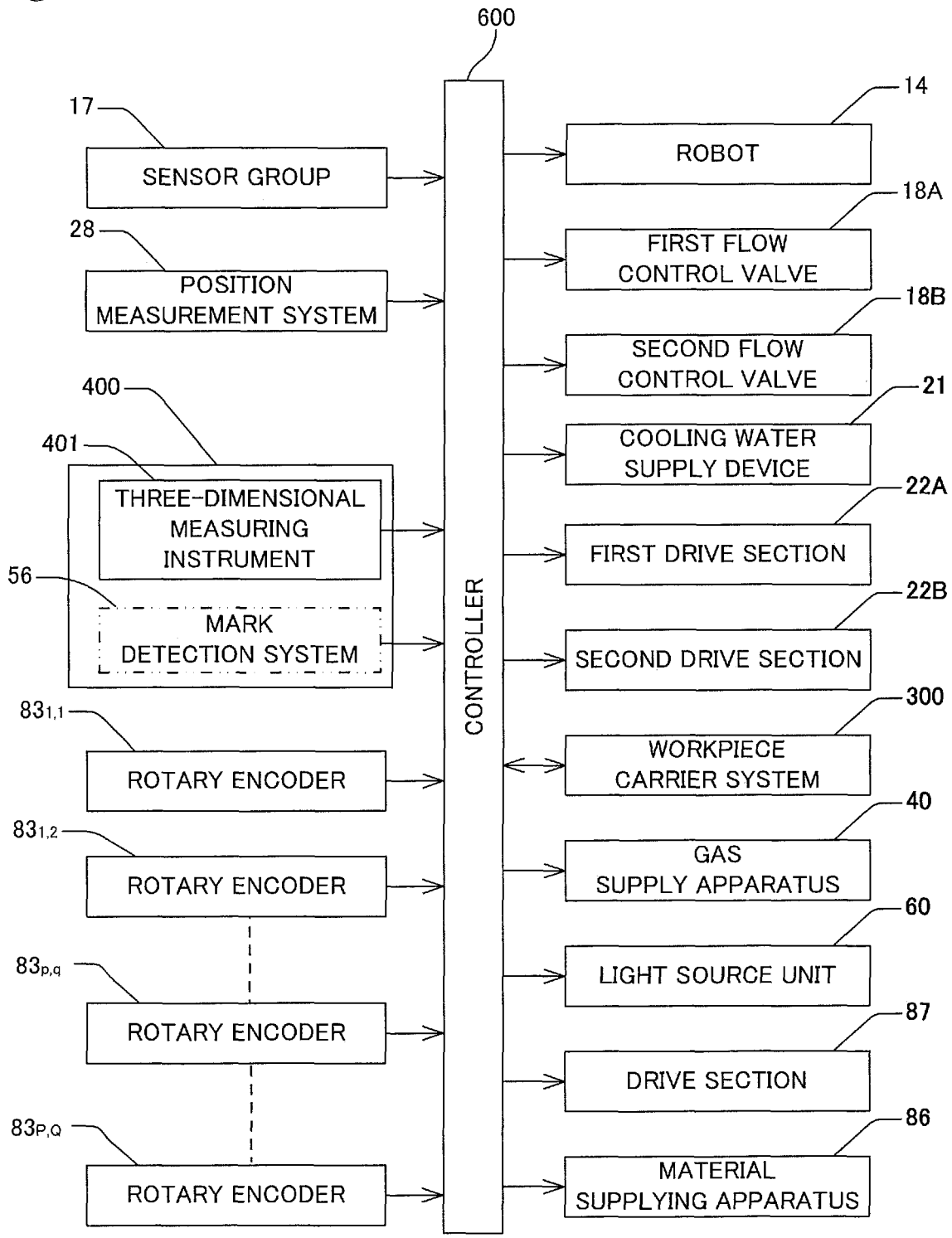
FIG. 6 is a block diagram indicating an input/output relation of a controller which mainly structures a control system of the shaping device.

Water level sensor 26, as is illustrated in arrows b and b' in FIG. 2, is movable back and forth along a direction perpendicular to the Z-axis (the Y-axis direction in the embodiment) by a second drive section 22B (not shown in FIG. 2, refer to FIG. 6). Note that water level sensor 26 does not have to be movable, or may be movable in the Z-axis direction in addition to the direction perpendicular to the Z-axis or instead of the direction perpendicular to the Z-axis.

In the embodiment, at the time of shaping, the first drive section 22A and the second drive section 22B are controlled by controller 600 when necessary, and by this control, outlet portion 20 and water level sensor 26 are moved in the Y-axis direction linked with a change of position in the Y-axis direction of stage 12.

Also, in the embodiment, during the shaping, the first flow control valve 18A and the second flow control valve 18B are controlled by controller 600 based on measurement information of water level sensor 26 so that the water surface (liquid surface) of cooling water CW is to be located at a position higher by a predetermined distance than object surface TAS of workpiece W mounted on stage 12 (table 12*a*). Details on this will be described further later on.

In shaping system 100 according to the embodiment, at the time of additive manufacturing and the like to the workpiece, position and attitude of the workpiece (stage 12) is controlled with respect to shaping head section 500, or to be more specific, with respect to a beam from a beam irradiation section to be described later on, in order to form a shaped object of a desired shape with respect to the workpiece and the like. In principle, reversely, the beam from the beam irradiation section may be movable, or both the beam and the workpiece (stage) may be movable.

In the embodiment, moving apparatus 200 is equipped with a position measurement system 28 (refer to FIG. 6) which measures position information on robot 14 in the X-axis direction and the Y-axis direction. Measurement information of position measurement system 28 is sent to controller 600.

In the embodiment, as it will be described later on, position information (shape information in the embodiment) in a three-dimensional space of at least a part of an object surface (e.g., upper surface) on workpiece W mounted on stage 12 is measured by measurement device 400, and additive manufacturing (shaping) is performed on workpiece W after the measurement. Accordingly, when the shape information of at least a part of the object surface on workpiece W is measured, controller 600, by associating the measurement results with detection information of sensor group 17 (various sensors that robot 14 is equipped with) and measurement results of position measurement system 28 at the time of measurement, can correlate the position and the attitude of the object surface on workpiece W mounted on stage 12 with a reference coordinate system (hereinafter called a stage coordinate system) of shaping system 100. This will hereinafter enable position control in directions of six degrees of freedom of object surface TAS on workpiece W with respect to a target portion, by an open loop control of the position and the posture of stage 12, based on detection information of sensor group 17 and measurement results of position measurement system 28. In the embodiment, resetting is easy, since an absolute type encoder which does not require origin setting is used as sensor group 17 and position measurement system 28. Note that the position information in the three-dimensional space described earlier, which is to be measured by measurement device 400 and is used to allow position control in directions of six degrees of freedom with respect to the target portion of the object surface on workpiece W by the open loop control of the position of stage 12 in directions of six degrees of freedom, is not limited to shape, as long as the information is three-dimensional position information on at least three points which corresponds to the shape of the object surface.

Measurement device 400 performs measurement of three-dimensional position information, e.g., shape, of a workpiece to correlate the position and the attitude of the workpiece mounted on stage 12 with the stage coordinate system. Measurement device 400, as is shown in FIG. 6, is equipped, for example, with a laser non-contact three-dimensional measuring instrument 401. Three-dimensional measuring instrument 401 is structured in a manner similar to a shape measurement apparatus disclosed in, for example, U.S. Patent Application Publication No. 2012/0105867.

With the measurement method using three-dimensional measuring instrument 401 according to the embodiment, for example, by using an optical cutting method, a linear projection pattern consisting of one line beam is projected on the surface of the test object, and each time the linear projection pattern is scanned on the entire test object surface, the linear projection pattern projected on the test object is to be imaged from an angle different from the projection direction. Then by a captured image of the test object surface which has been imaged, height of the test object surface from a reference plane is calculated using a principle of triangulation and the like for each pixel in the longitudinal direction of the linear projection pattern, and the three-dimensional shape of the test object surface is obtained. However, while scanning of the line beam with respect to the test object in directions parallel to the X, Y planes is performed by movement of a sensor section in the apparatus described in U.S. Patent Application Publication No. 2012/0105867, the embodiment differs on the point that the scanning is performed by movement of stage 12. As a matter of course, the scanning described earlier may be performed by movement of the sensor section, or by movement of both the sensor section and stage 12.

Measurement device 400 may be equipped with a mark detection system 56 (refer to FIG. 6) which optically detects an alignment mark, instead of three-dimensional measuring instrument 401 described above, or in addition with the three-dimensional measuring instrument described above. Mark detection system 56, for example, can detect an alignment mark formed on a workpiece. Controller 600 calculates position and attitude of the workpiece (or stage 12) by accurately detecting each of the center positions (three-dimensional coordinates) of at least three alignment marks using mark detection system 56. Such mark detection system 56, for example, can be structured including a stereo camera. Mark detection system 56 may optically detect alignment marks which are formed in advance at a minimum of three places on stage 12.

In the embodiment, controller 600 scans the surface (object surface) of workpiece W with respect to the line beam from three-dimensional measuring instrument 401 in the manner described above, and acquires the surface shape data. Then, controller 600 performs a least squares processing using the surface shape data and correlates the three-dimensional position and attitude of the object surface on the workpiece with respect to the stage coordinate system. Here, since the position in directions of six degrees of freedom of stage 12 is controlled by controller 600 on the stage coordinate system even during the measurement with respect to the test object (workpiece W) described above, control of position (that is, position and attitude) of workpiece W in directions of six degrees of freedom including the time of additive manufacturing by three-dimensional shaping can all be performed by the open loop control of stage 12 according to the stage coordinate system, after the position and attitude of the workpiece are correlated with the stage coordinate system.

Shaping head section 500, as is shown in FIG. 2, is equipped with a beam irradiation section 520 including a light source system 510 and a condensing optical system 82 that emits beams $LB_1$ and $LB_2$ which are tilted with respect to an optical axis AX within a YZ plane via condensing optical system 82 (terminal lens 82a), a material supplying section 530 which supplies a powdered shaping material PD, a cover member 30 connected to a lower end of a barrel 85 which holds condensing optical system 82, and a gas supply apparatus 40 (refer to FIG. 6) which supplies inert gas such as, e.g., nitrogen ($N_2$), via a gas supplying port to be described later on within a first space 30a inside cover member 30.

Light source system 510 is equipped with, for example, a light source unit 60 (not shown in FIG. 2, refer to FIG. 6) including a plurality of laser units, and an illuminance uniformizing optical system (not shown) equipped with a double fly-eye optical system, a condenser lens system, and the like, and beams emitted from each of a plurality of laser units are mixed using the illuminance uniformizing optical system to generate parallel beams whose cross sectional surface illuminance distribution is uniformized.

Note that the structure of the illuminance uniformizing optical system may be any structure. For example, the illuminance uniformizing optical system may be structured using a rod integrator, a collimator lens system, and the like.

Light source unit 60 (a plurality of laser units) of light source system 510 is connected to controller 600 (refer to FIG. 6), and the on-off of the plurality of laser units is controlled individually by controller 600. This allows light amount (laser output) of the laser beam irradiated on (the object surface on) workpiece W from beam irradiation section 520 to be adjusted.

Note that shaping system 100 does not have to be equipped with the light source, or the light source and the illuminance uniformizing optical system. For example, a parallel beam having a desired light amount (energy) and desired illuminance uniformity can be supplied from an external device to shaping system 100.

Other than light source system 510, as is shown in FIG. 2, beam irradiation section 520 has a beam cross sectional surface intensity conversion optical system 78, a mirror array 80 which is a kind of spatial light modulator (SLM: Spatial Light Modulator), and condensing optical system 82 which condenses light from mirror array 80, arranged sequentially on an optical path of the parallel beam from light source system 510. Here, the spatial light modulator is a collective term of elements which spatially modulate amplitude (intensity), phase, or state of polarization of light proceeding in a predetermined direction.

Beam cross sectional surface intensity conversion optical system 78 converts intensity distribution of the cross sectional surface of the parallel beam from light source system 510. In the embodiment, beam cross sectional surface intensity conversion optical system 78 converts the parallel beam from light source system 510 into a donut shaped (annular shaped) parallel beam whose intensity in the area including the center of the cross sectional surface is almost zero. Beam cross sectional surface intensity conversion optical system 78, in the embodiment, is structured, for example, by a convex conically shaped reflection mirror and a concave conically shaped reflection mirror which are arranged sequentially on the optical path of the parallel beam from light source system 510. The parallel beam from light source system 510 is radially reflected on a reflection surface of the convex conically shaped reflection mirror, and by the reflection beam being reflected on a reflection surface of the concave conically shaped reflection mirror, the beam is converted into an annular shaped parallel beam.

In the embodiment, the parallel beam which has passed through beam cross sectional surface intensity conversion optical system 78 is irradiated on the workpiece via mirror array 80 and condensing optical system 82 in the manner to be described later on. By converting the cross sectional surface intensity distribution of the parallel beam from light source system 510 using beam cross sectional surface intensity conversion optical system 78, intensity distribution of the beam incident on a pupil plane (entrance pupil) PP of condensing optical system 82 from mirror array 80 can be changed. Also, by converting the cross sectional surface intensity distribution of the parallel beam from light source system 510 using beam cross sectional surface intensity conversion optical system 78, intensity distribution in the exit surface of condensing optical system 82 of the beam emitted from condensing optical system 82 can be substantially changed.

Note that beam cross sectional surface intensity conversion optical system 78 is not limited to the combination of the convex conically shaped reflection mirror and the concave conically shaped reflection mirror, and may be structured using the combination disclosed in, for example, U.S. Patent Application Publication No. 2008/0030852, which uses a diffractive optical element, an afocal lens, and a conical axicon system. As long as beam cross sectional surface intensity conversion optical system 78 converts the cross sectional surface intensity distribution of the beam, various structures can be considered. Depending on the structure of beam cross sectional surface intensity conversion optical system 78, the parallel beam from light source system 510, intensity in the area including the center (optical axis of condensing optical system 82) of the cross sectional surface can be made to be not almost zero, but to be smaller than the intensity in an area on the outer side.

Mirror array 80, in the embodiment, has a base member 80A which has a surface (hereinafter called reference surface for convenience) making an angle of 45 degrees ($\pi/4$) with respect to the XY plane and an XZ plane, e.g., M (=P×Q) mirror elements $81_{p,q}$ (p=1 to P, q=1 to Q) arranged, for example, in a P row Q column matrix on the reference surface of base member 80A, and a drive section 87 (not shown in FIG. 2, refer to FIG. 6) including M actuators (not shown) which individually drive each mirror element $81_{p,q}$. Mirror array 80 can substantially form a large reflection surface parallel to the reference surface, by adjusting the tilt with respect to the reference surface of multiple mirror elements $81_{p,q}$ (for example, by making the reflection surface of all mirror elements $81_{p,q}$ parallel to the reference surface).

The reflection surface of each mirror elements $81_{p,q}$ of mirror array 80 is, for example, a rectangular shape. Each mirror element $81_{p,q}$ of mirror array 80 is structured, for example, rotatable around a rotation axis parallel to one of the diagonal lines of the reflection surface of each mirror element $81_{p,q}$, and the tilt angle with respect to the reference surface of the reflection surface can be set to an arbitrary angle within a predetermined angle range. The angle of the reflection surface of each mirror element is measured by a sensor which detects the rotation angle of the rotation axis, such as, for example, a rotary encoder $83_{p,q}$ (not shown in FIG. 2, refer to FIG. 6).

Drive section 87 includes, for example, an electromagnet or a voice coil motor as an actuator, and the individual mirror elements $81_{p,q}$ are driven by the actuator and operate at an extremely high response.

Figure 3:
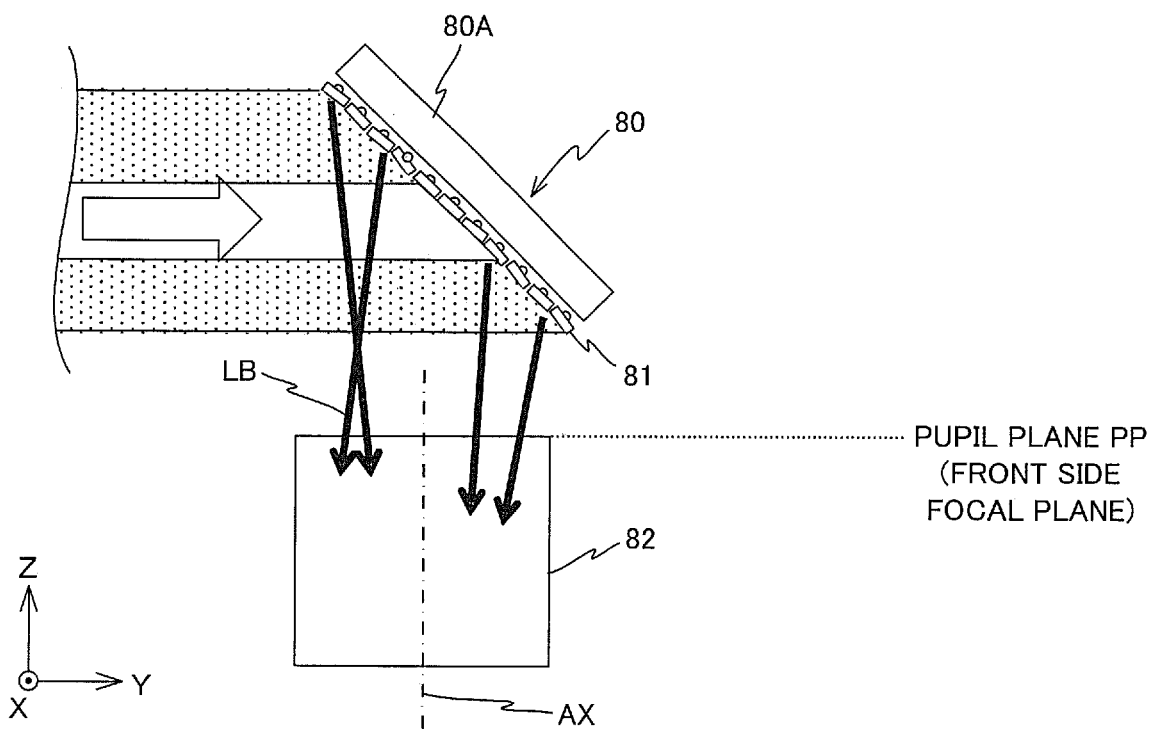
FIG. 3 is a view showing a state in which a parallel beam from a light source system irradiates a mirror array and reflection beams from each of a plurality of mirror elements are shown with respect to a condensing optical system.

Of the plurality of mirror elements which structures mirror array 80, each mirror element $81_{p,q}$ illuminated by the annular shaped parallel beam of light source system 510 emits a reflection beam (parallel beam) in a direction corresponding to a tilt angle of the reflection surface and makes the beam enter condensing optical system 82 (refer to FIG. 3). Note that in the embodiment, the cross sectional surface shape (cross sectional surface intensity distribution) of the parallel beam incident on mirror array 80 may be a shape different from the annular shape. For example, a beam may be irradiated only on a part of the annular shaped area (e.g., a first part on one side of optical axis AX and a second part on the other side) in the periphery of optical axis AX on pupil plane PP of condensing optical system 82. Also, beam cross sectional surface intensity conversion optical system 78 does not have to be provided.

Condensing optical system 82 is an optical system of high N.A. with an N.A. of, for example, 0.5 or more, preferably 0.6, and of low aberration. Condensing optical system 82, as is shown in FIG. 2, is structured by one or a plurality of large-diameter lenses (showing terminal lens 82a representatively in FIG. 2 and the like) which includes terminal lens 82a held by barrel 85 having a cylindrical shape. In the embodiment, as terminal lens 82a, a lens (called a hollow lens for convenience) is used which has a hollow section (through hole) TH penetrating in optical axis AX direction in the center section including optical axis AX. In the case condensing optical system 82 has a plurality of lenses; lenses other than terminal lens 82a may, or may not be hollow lenses. Since condensing optical system 82 has a large diameter, low aberration, and high N.A., the plurality of parallel beams from mirror array 80 can be condensed on a rear side focal plane. Beam irradiation section 520 can condense the beam emitted from condensing optical system 82 (a terminal lens 82a), for example, in a spot shape (or a slit shape). Also, since condensing optical system 82 is structured by one or a plurality of large-diameter lenses, the size of the area on the incident plane can be increased, which allows more amount of light energy to be taken in than in the case of using a condensing optical system that has a small N.A. Accordingly, the beam condensed by condensing optical system 82 according to the embodiment is to have an extremely sharp and high energy density, which makes it possible to increase the processing accuracy of additive manufacturing.

In the embodiment, a case will be described in which shaping (processing) is performed while relatively scanning the beam and workpiece W which has shaping object surface TAS in a scanning direction (scan direction) by movable stage 12 in a scanning direction (in FIG. 2, the Y-axis direction as an example) parallel to the XY plane, as it will be described later on. Note that, on shaping, it is needless to say that stage 12 may be moved in at least one direction of the X-axis direction, the Z-axis direction, the θx direction, the θy direction, and the θz direction, while stage 12 is moving in the Y-axis direction. Also, as it will be described later on in the embodiment, a powdered shaping material (metal material) supplied by material supplying section 530 is to be melted by the energy of the beam (laser beam). Accordingly, as is described earlier, if the total amount of energy that condensing optical system 82 takes in increases, the energy of the beam emitted from condensing optical system 82 becomes larger which increases the amount of metal that can be melted per unit time. This improves shaping throughput, if supply amount of the shaping material and the speed of stage 12 are increased.

With shaping system 100 of the embodiment, shaping object surface TAS is positioned on a predetermined surface (hereinafter called a shaping surface MP (refer to, e.g., FIG. 2). With shaping system 100, shaping (processing) can be performed, for example, by forming a spot shaped irradiation area (beam spot) of the beam on shaping surface MP, and relatively scanning workpiece W (object surface TAS) with respect to the beam (spot beam) which forms the beam spot.

With shaping system 100, on shaping for additive manufacturing to the workpiece, controller 600 performs position control in directions of 6-DOF of object surface TAS on workpiece W according to the open loop control described earlier. By this control, object surface TAS is controlled to be perpendicular to optical axis AX. Controller 600 moves stage 12 down by a predetermined distance (corresponding to the thickness of each layer) in the −Z direction each time shaping of each layer is completed, and concurrently controls the supply amount of cooling water CW from outlet portion 20 into tank 13 and the drainage amount of cooling water CW from inside tank 13 via the drain pipe by controlling the first flow control valve 18A and the second flow control valve 18B based on measurement information of water level sensor 26, so that the liquid surface of cooling water CW is maintained to a position a predetermined distance higher (slightly higher) than object surface TAS. To describe this further in detail, controller 600 sets in advance a target surface TS (refer to FIG. 2) to which the liquid surface of the cooling water should be positioned at a position only a predetermined distance higher than shaping surface MP, obtains a difference between the actual liquid surface and target surface TS based on the measurement information of water level sensor 26, and controls the degree of opening of the second flow control valve 18B and the first flow control valve 18A to make the difference be zero. This allows the liquid surface of cooling water CW to be adjusted (set) to be higher by a predetermined distance than object surface TAS positioned to shaping surface MP during shaping, in conjunction with the change of position in the Z-axis direction of object surface TAS of the workpiece on stage 12 and the progress of shaping.

Note that in the embodiment, while shaping surface MP described above is the rear side focal plane (e.g., refer to FIG. 2) of condensing optical system 82, the shaping surface may be a surface in the vicinity of the rear side focal plane. Also, in the embodiment, while shaping surface MP is perpendicular to optical axis AX on the exit side of condensing optical system 82, the surface does not have to be perpendicular.

As the method (such as the method of forming a beam spot, a slit shaped illumination area or the like as is described above) of setting or changing intensity distribution of the beam on shaping surface MP, a method can be employed, for example, of controlling an incidence angle distribution of the plurality of parallel beams incident on condensing optical system 82.

Note that while condensing position of the plurality of parallel beams LB can be controlled accurately and easily by changing the incidence angle of the plurality of parallel beams LB using mirror array 80 since condensing optical system 82 of the embodiment has a structure in which the pupil plane (entrance pupil) PP coincides with the front side focal plane, the system does not have to employ the structure in which the pupil plane (entrance pupil) of condensing optical system 82 coincides with the front side focal plane.

In the embodiment, mirror array 80 is employed, and by controller 600 making each mirror elements $81_{p,q}$ operate at an extremely high response, incidence angle of each of the plurality of parallel beams LB which enters pupil plane PP of condensing optical system 82 is controlled. This allows the intensity distribution of the beam on shaping surface MP to be set or changed. In this case, controller 600 can change the intensity distribution of the beam on shaping surface MP, such as, for example, at least one of shape, size, and number of the irradiation area of the beam, during relative movement of the beam and object surface TAS (a surface on which an target portion TA of shaping is set; a surface on workpiece W in the embodiment). In this case, controller 600 can change the intensity distribution of the beam on shaping surface MP continuously, or intermittently. Controller 600 can also change the intensity distribution of the beam on shaping surface MP, depending on the relative position between the beam and object surface TAS. Controller 600 can also change the intensity distribution of the beam on shaping surface MP, depending on the required shaping accuracy and throughput. Also, in the embodiment, the tilt angle of the reflection surface of each mirror element of mirror array 80 can be accurately controlled, since controller 600 detects the state of each mirror element (here, tilt angle of the reflection surface) using rotary encoder $83_{p,q}$ described earlier, which allows the state of each mirror element to be monitored real time.

Note that if the shape and size of the irradiation area formed on the shaping surface are not variable, the position of the irradiation area can be changed by controlling the incidence angle of one parallel beam incident on pupil plane of condensing optical system 82 using a solid mirror of a desired shape, instead of using mirror array 80.

Figure 4:
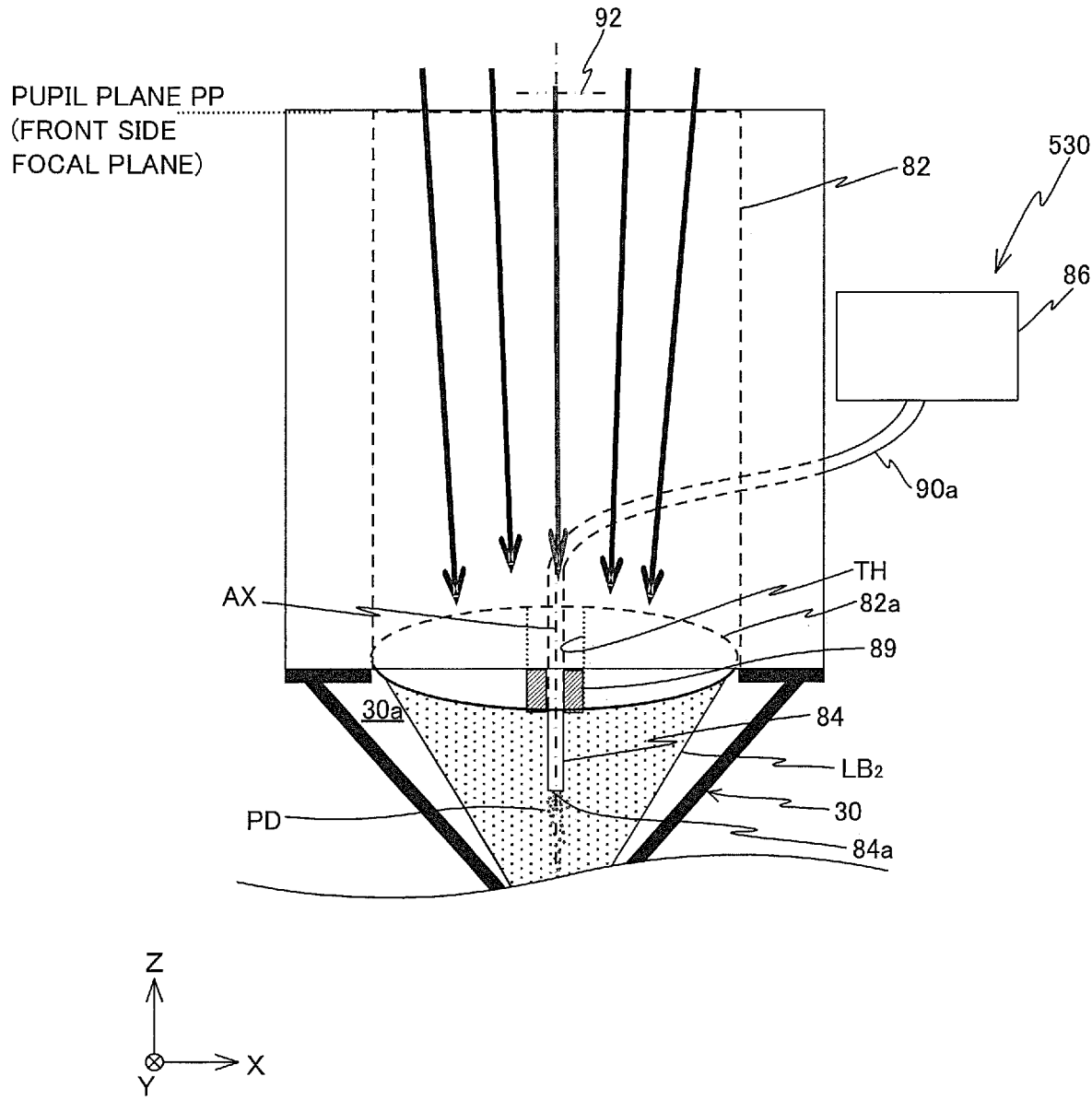
FIG. 4 is a view showing the condensing optical system of the shaping head section and a part below, in a partly omitted view when seen from a −Y direction.

FIG. 4 shows condensing optical system 82 of shaping head section 500 and the part below, partly omitted when viewed from the −Y direction. Also, FIG. 5 shows barrel 85 and the part below in FIG. 2 enlarged, along with a neighboring area of target portion TA on workpiece W. Material supplying section 530, as is shown in FIG. 4, has a supply pipe 84 extending in the Z-axis direction arranged along optical axis AX within a hollow section TH of terminal lens 82a of condensing optical system 82, and a material supplying apparatus 86 connected to one end (upper end) of supply pipe 84 via a piping 90a. At the other end (lower end) of supply pipe 84, a material supplying port 84a is formed, and material supplying port 84a is arranged within the first space 30a inside cover member 30.

Supply pipe 84, as is shown in FIG. 4, is arranged within hollow section TH of terminal lens 82a, and the gap between the outer periphery surface of supply pipe 84 and the inner surface of hollow section TH of terminal lens 82a is sealed with a seal member 89. Therefore, as is shown in FIG. 5, the first space 30a within cover member 30 below terminal lens 82a is separated from a space (a second space) 85a within barrel 85 above terminal lens 82a, and the flow of gas from the first space 30a to the second space 85a is blocked. Note that a structure may be employed in which gas can pass through hollow section TH in terminal lens 82a, without seal member 89 being provided. In this case, the pressure in the space at the upper side of terminal lens 82a (the second space 85a inside barrel 85) may be set higher than the pressure in the space at the lower side of terminal lens 82a (the first space 30a), so that a flow of gas from the exit surface side to the incidence plane side does not occur in hollow section TH of terminal lens 82a. Or, gas (such as an inert gas) may flow out at all times from the second space 85a toward the first space 30a.

Cover member 30, as is shown enlarged in FIG. 5, consists of a hollow conical member (a plate member of almost an even thickness having a conical surface on the outer surface and the inner surface), and at the bottom surface (upper side in FIG. 5), an attachment section 31 is provided which is ring-shaped in a planar view. Attachment section 31 consists of a ring-shaped plate member whose inner diameter is smaller than the bottom surface of cover member 30 (slightly larger than the outer diameter of terminal lens 82a) and the outer diameter is slightly larger than the bottom surface of cover member 30. Cover member 30 is fixed to the lower end surface of barrel 85 via attachment section 31. That is, cover member 30 is suspended and supported by barrel 85. At the tip portion of cover member 30 (the lower end part in FIG. 5), an outlet 30b of beams ($LB_1$, $LB_2$) irradiated on object surface TAS is formed at the tip. Note that to suppress vibration of cover member 30 from traveling to barrel 85, a vibration isolation member (such as rubber) may be arranged in between barrel 85 and cover member 30. Also, cover member 30 may be supported by a support member different from barrel 85.

Referring back to FIG. 4, material supplying apparatus 86 has a cartridge inside in which shaping material PD is housed, and supplies shaping material PD within the cartridge on the object surface along optical axis AX, for example, by making the material fall freely from material supplying port 84a toward outlet 30b via piping 90a and supply pipe 84, or by making the material fall by pushing the material out at a predetermined pressure. In the case of making shaping material PD fall in this manner, normally the shaping material diffuses the further it falls (as the material approaches the tip of cover member 30), and when the distance from the lower end of supply pipe 84 to object surface TAS is a predetermined distance or more, the shaping material diffuses to an area larger than outlet 30b. This will make fine shaping on the object surface difficult, even if shaping material PD is melted with beams $LB_1$ and $LB_2$.

Therefore, in the embodiment, gas supply apparatus 40 (refer to FIG. 6) described earlier is provided that supplies nitrogen which is a type of inert gas to the inner space (the first space) 30a of cover member 30, so that a spiral swirling flow shown by code SF in FIG. 5 is generated along a conical surface shape of an inner surface, using the conical surface shape of an inner surface 30c of cover member 30. Note that instead of nitrogen, gas supply apparatus 40 may supply rare gas (e.g., helium (He), neon (Ne), argon (Ar) or the like) which is a kind of inert gas, a mixed gas of nitrogen and at least one kind of rare gas, or a mixed gas of a plurality of kinds of rare gas into the first space 30a.

Near the upper end of cover member 30, an opening 30d is formed to connect a gas supply pipe 42 shown in FIG. 5. One end of gas supply pipe 42 is connected to opening 30d. To describe this further in detail, one end of gas supply pipe 42 is inserted into opening 30d formed in cover member 30 from the outer side so that the one end intersects the wall of cover member 30 at an acute angle in a planar view (when viewed from above), for example, in a tangential direction of inner surface 30c of cover member 30, and the tip of a gas supplying port 42a of gas supply pipe 42 is exposed within the first space 30a inside cover member 30. In this case, gas supplying port 42a is positioned at a part higher than the center in the height direction of cover member 30. Also, gas supplying port 42a is positioned at a position higher than that of material supplying port 84a.

Also, one end of gas supply pipe 42 is slightly tilted with respect to the XY plane, such that the one end is lower than the other end in a state inserted into opening 30d of cover member 30. That is, opening 30d described above is formed in cover member 30 intersecting with inner surface 30c of cover member 30 at an acute angle in a planar view and in a direction slightly tilted with respect to the XY plane.

The other end of gas supply pipe 42 is connected to gas supply apparatus 40 (refer to FIG. 6). Therefore, in an operating state of gas supply apparatus 40, nitrogen (inert gas) is sent into the first space 30a substantially along the conical inner surface 30c of cover member 30, for example, substantially along the tangential direction of inner surface 30c of cover member 30, via gas supplying port 42a of gas supply pipe 42 and nitrogen which has been sent flows toward outlet 30b of cover member 30 in a spiral swirling flow (swirling flow due to circulation) around optical axis AX along inner surface 30c of cover member 30 as is shown in code SF in FIG. 5, and flows outside the first space 30a from outlet 30b. With swirling flow SF in this case, since flow speed becomes faster when the flow approaches the center, static pressure becomes lower when the flow approaches the center according to the Bernoulli's theory (except for the near pole area in the center where viscous influence becomes strong). Also, the diameter of inner surface 30c of cover member 30 becomes smaller toward the bottom (when approaching outlet 30b of cover member 30). Accordingly, cover member 30 functions as a convergence nozzle (convergent nozzle) which accelerates fluid, and the flow speed of gas flowing inside cover member 30 increases when the gas approaches the narrow part (tip of cover member 30) while the pressure decreases. Accordingly, static pressure in swirling flow SF is lowest at the center of the position of outlet 30b of cover member 30. Therefore, powdered shaping material PD which drops directly below from supply pipe 84 is narrowed corresponding to the shape of inner surface 30c of cover member 30 toward the bottom (when approaching outlet 30b of cover member 30) by the swirling flow of nitrogen (inert gas). Accordingly, in the operating state of gas supply apparatus 40, powdered shaping material PD supplied from supply pipe 84 can be converged to almost one point (here, a point on optical axis AX), and by melting shaping material PD with beams $LB_1$ and $LB_2$, a three-dimensional shaped object can be made with excellent shaping accuracy and high resolution secured. Gas supply apparatus 40 according to the embodiment can adjust the temperature, flow speed and the like of the inert gas sent into the first space 30a. Note that opening 30d provided in cover member 3 may be a gas supplying port. In this case, the tip of gas supply pipe 42 may be connected to opening 30d of cover member 30 so that the tip is not exposed to the first space 30a.

Also, gas supplying port 42a (opening 30d) may be arranged lower than the center in the height direction of cover member 30. Also, gas supplying port 42a (opening 30d) may be arranged lower than material supplying port 84a.

Now, as it is obvious from the description on adjusting the cooling water amount within tank 13 described earlier, at the time of shaping, the liquid surface (water surface) of cooling water CW is to be set to a position higher than that of object surface TAS of workpiece W. However, when there is cooling water at target portion TA, cooling water CW may have an adverse effect and a desired shaping accuracy may not be secured. Therefore, with shaping system 100, as is shown in FIGS. 2 and 5, after swirling flow SF described above is generated, inert gas jetting out from outlet 30b at the tip of cover member 30 is to be supplied toward target portion TA. In this case, when the gas jets out from outlet 30b at the tip of cover member 30 and the flow speed of the inert gas supplied to target portion TA is increased to a high speed, the flow of the inert gas can blow away and remove cooling water CW that exists on a partial area on object surface TAS including target portion TA. By this operation, the partial area including target portion TA is set locally to a non-liquid-immersion state (dry state), and supply of shaping material PD and irradiation of the beam to the target portion is performed in the local non-liquid-immersion state, that is, in a state where both an area covered with cooling water EC which is supplied and an area which is not covered with cooling water EC which is supplied exist on object surface TAS, and shaping to target portion TA is performed. Accordingly, making of a three-dimensional shaped object with excellent shaping accuracy and high resolution secured becomes possible, without being affected by the cooling water.

Note that as is obvious from the description above, in the embodiment, since the irradiation area of the beams on shaping surface MP is formed by beams $LB_1$ and $LB_2$ emitted via outlet 30b, the range in which shape, size, or position can be changed of the irradiation area formed on the shaping surface is limited by the shape and size of outlet 30b.

Also, in the embodiment, as is obvious in FIG. 5, since gas supplying port 42a is provided at a height position almost the same as that of the lower surface of terminal lens 82a, the lower surface of terminal lens 82a is purged of gas due to a high speed inert gas flow, which allows terminal lens 82a to be protected from contamination (including adhesion of shaping material from material supplying port 84a). In addition, since terminal lens 82a is physically protected by cover member 30, the terminal lens is protected from contamination by contaminants in the atmosphere outside cover member 30.

Although the description is out of sequence, material supplying apparatus 86 will be described further here. Material supplying apparatus 86, for example, has two powder cartridges, and each of the two powder cartridges contains powder of a first shaping material (e.g., titanium) and powder of a second shaping material (e.g., stainless steel). Note that in the embodiment, while material supplying apparatus 86 is equipped with two powder cartridges for supplying two kinds of shaping materials, the powder cartridges equipped in material supplying apparatus 86 may be one instead.

In the embodiment, material supplying apparatus 86 is connected to controller 600 (refer to FIG. 6), and at the time of shaping, material supplying apparatus 86 (an internal control unit) selects one of the two powder cartridges according to instructions from controller 600, and shaping material from the selected powder cartridge is supplied to supply pipe 84 via piping 90a. Note that by changing the structure of material supplying apparatus 86, a structure may be employed in which a mixture of the first shaping material from one of the powder cartridges and the second shaping material from the other powder cartridge can be supplied to supply pipe 84 via piping 90a when necessary.

Controller 600 can adjust the supply amount per unit time of the shaping material supplied to supply pipe 84 from the powder cartridge selected by material supplying apparatus 86. On adjustment of the supply amount per unit time of the shaping material supplied to supply pipe 84, negative pressure is generated outside the powder cartridge with respect to the inside when acquiring powder from the powder cartridge, and adjustment can be performed by adjusting the level of negative pressure, or by providing a valve for adjusting the amount of powder supplied to piping 90a from material supplying apparatus 86 and adjusting the degree of opening of the valve, or the like.

In the embodiment, since an annular shaped parallel beam is irradiated on mirror array 80, a reflection beam from mirror array 80 is incident on a partial area (a partial area where N.A. is large) near the periphery of condensing optical system 82, and the beam is condensed (refer to FIG. 2) on shaping surface MP (coincides with the rear side focal plane of condensing optical system 82 in the embodiment) of condensing optical system 82, via the emitting end of condensing optical system 82, that is, an area in the periphery apart from optical axis AX of terminal lens 82a positioned at the emitting end of beam irradiation section 520. That is, only light that passes near the periphery of the same condensing optical system 82 forms, for example, a beam spot. Therefore, a beam spot with high quality can be formed than when forming a beam spot (laser spot) by condensing light via separate optical systems on the same area. Also, in the embodiment, irradiation of the beam on supply pipe 84 arranged within hollow section TH of terminal lens 82a of condensing optical system 82 and on piping 90a which has one end connected to the upper end of supply pipe 84 can be limited. Therefore, in the embodiment, all the reflection beams from mirror array 80 can be used to form spots, and a light shielding member or the like which is provided to limit irradiation of the beams on supply pipe 84 in the part corresponding to supply pipe 84 on the incidence plane side of condensing optical system 82 will no longer be necessary. Annular shaped parallel beams are to illuminate mirror array 80 for these reasons.

Note that to limit the beams from condensing optical system 82 being incident on supply pipe 84, for example, a limit member 92 shown in a two-dot chain line in FIG. 4 may be provided at the incidence plane side (e.g., pupil plane PP) of condensing optical system 82. Limit member 92 limits incidence on supply pipe 84 of the beam from condensing optical system 82. As limit member 92, while a light shielding member may be used, a light shielding filter or the like may also be used. In this case, the parallel beams incident on condensing optical system 82 may be a parallel beam having a circular cross sectional surface, or may be an annular shaped parallel beam. In the latter case, since the beams are not irradiated on limit member 92, the reflection beams from mirror array 80 can all be used to form spots.

In the embodiment, at the time of additive manufacturing and the like to the workpiece, as is shown in FIGS. 2 and 5, the beams (indicated as beams $LB1_1$ and $LB1_2$ in FIGS. 2 and 5 for convenience) that pass through near the periphery of condensing optical system 82 (terminal lens 82a) and pass the optical path on the +Y side and the −Y side (the front and rear of the scanning direction of workpiece W (stage 12)) of supply pipe 84 are condensed directly below supply pipe 84 and a beam spot is formed on the shaping surface, and to a spot beam which forms the beam spot, shaping material PD is supplied from material supplying port 84a through outlet 30b of cover member 30 along optical axis AX. According to this, weld pool WP is formed directly below supply pipe 84. And, this formation of weld pool WP is performed while stage 12 is scanned in the scanning direction (+Y direction in FIG. 5). This makes it possible form a bead (melted and solidified metal) BE (refer to FIG. 5) of a predetermined length in a predetermined width (width of beam spot). Note that beams $LB_1$ and $LB_2$ shown in FIG. 5 may be separate parallel beams that are incident on pupil plane PP of condensing optical system 82 at different incidence angles each reflected by different mirror elements $81_{p,q}$ of mirror array 80, or may be the same parallel beam, such as for example, a part of a parallel beam having an annular sectional shape.

In the case of making the plurality of parallel beams enter pupil plane PP of condensing optical system 82, when the incidence angles of the plurality of parallel beams LB incident on condensing optical system 82 are adjusted, for example, so that the width in the X-axis direction, the width in the Y-axis direction, or the width in the X-axis direction and the width in the Y-axis direction are gradually narrowed without the number of parallel beams LB incident on condensing optical system 82 being reduced, condensing density (energy density) of the beam increases. Accordingly, in response, by increasing the supply amount of the powder (shaping material) per unit time and increasing the scanning speed of object surface TAS, it becomes possible to keep the thickness of the layer of bead BE to be formed constant, and also to keep the level of throughput high. However, the adjustment method is not limited to this, and other adjustment methods can also be used to keep the thickness of the layer of bead BE to be formed constant. For example, laser output (energy amount of the laser beam) of at least one of the plurality of laser units may be adjusted according to the width of the beam in the X-axis direction, the width in the Y-axis direction, or the width in the X-axis direction and the width in the Y-axis direction, or the number of parallel beams LB incident on condensing optical system 82 from mirror array 80 may be changed. In this case, the adjustment is simple, although the throughput slightly decreases when compared to the adjustment method described above.

FIG. 6 shows a block diagram that indicates an input/output relation of controller 600 which mainly structures a control system of shaping system 100. Controller 600 includes a workstation (or a microcomputer) and the like and has overall control over constituent parts of shaping system 100.

The basic function of shaping system 100 according to the embodiment structured in the manner described above is to add a desired shape by three-dimensional shaping to an existing component (workpiece). The workpiece is supplied to shaping system 100 and then is carried out from shaping system 100 after a desired shape is accurately added. At this point, the actual shaping data of the shape that has been added is sent to an external device from controller 600, such as a host device. The series of operations performed in shaping system 100 is roughly in the manner described below.

First, when stage 12 is at a predetermined loading/unloading position, the workpiece is loaded on stage 12 by a workpiece carrier system 300 (refer to FIG. 6). At this time, stage 12 is in a reference state $(Z, \theta x, \theta y, \theta z)=(Z_0, 0, 0, 0)$, and the X, Y positions of stage 12 coincide with the X, Y positions of robot 14 measured by position measurement system 28. That is, stage 12 is at a reference point (x=0, y=0) which is defined on robot 14.

Next, stage 12 on which workpiece W is loaded is moved to an area below measurement device 400 by controller 600. The movement of stage 12 is performed by controller 600 driving robot 14 in the X-axis direction (and the Y-axis direction) on the floor surface, based on the measurement information of position measurement system 28. Stage 12 maintains the reference state previously described also during this movement.

Next, controller 600 performs measurement of position information within a three-dimensional space (shape information in the embodiment) of at least a part of object surface TAS on workpiece W that is on stage 12 in the reference state, using measurement device 400. Hereinafter, it becomes possible to control the position in directions of 6-DOF of object surface TAS on workpiece W on the stage coordinate system (reference coordinate system) according to open loop control, based on the measurement results.

Next, controller 600 moves stage 12, on which workpiece W having completed measurement of shape information on at least a part of object surface TAS is mounted, toward an area below shaping head section 500 (cover member 30). On this operation, the first flow control valve 18A and the second flow control valve 18B are in a fully closed state.

When stage 12 moves along a predetermined route and reaches a predetermined position below shaping head section 500, the second part 15b of connector 15 connected to one end of drain pipe 16 is attached to the first part 15a provided at stage 12 as is previously described, and one end of drain pipe 16 is connected to tank 13 (stage 12).

Next, by controller 600, cooling water CW is supplied into tank 13 until the liquid surface (water surface) coincides with target surface TS. This supply of cooling water CW is performed in the following procedure. That is, controller 600 opens the second flow control valve 18B to a predetermined degree, and begins the supply of cooling water CW from outlet portion 20 into tank 13 while monitoring the measurement information of water level sensor 26. Then, when the liquid surface of cooling water CW is confirmed to coincide with target surface TS based on the measurement information of water level sensor 26, controller 600 stops the supply of cooling water CW from outlet portion 20 into tank 13 by moving the second flow control valve 18B into a fully closed state. Note that if additive manufacturing is possible without being affected by cooling water CW, the supply of cooling water CW does not have to be stopped. That is, the supply of the cooling water from outlet portion 20 may be performed, concurrently with the additive manufacturing.

Next, additive manufacturing according to three-dimensional shaping is performed in which the shape corresponding to 3D data is added to the workpiece on stage 12. This additive manufacturing is performed, for example, in the following manner.

That is, controller 600 converts the three-dimensional CAD data of the shape to be added by additive manufacturing (shape in which the shape of the workpiece subject to additive manufacturing is removed from the shape of the object made after additive manufacturing has been applied) serving as three-dimensional shaping data to, e.g., STL (Stereo Lithography) data, and then furthermore generates data for each layer sliced in the Z-axis direction from this three-dimensional STL data. Then, controller 600 controls moving apparatus 200 and shaping head section 500 so that additive manufacturing is performed on each layer of the workpiece based on the data of each layer, and repeatedly performs formation of the beam spot in the local non-liquid-immersion state described earlier and formation of weld pool WP by supplying shaping material PD from supply pipe 84 to the spot beam while scanning stage 12 in the scanning direction, from a first layer to an $N^{th}$ layer. Here, while stage 12 is moved downward by a predetermined distance by robot 14 based on instructions from controller 600 each time shaping of the $n^{th}$ layer (n=1 to N−1) is completed, in conjunction with this downward movement of stage 12, opening degree control (including opening and closing) of the second flow control valve 18B and the first flow control valve 18A is performed by controller 600 based on the measurement information of water level sensor 26, and the amount of cooling water CW within tank 13 is adjusted so that the liquid surface (water surface) coincides with target surface TS (a plane higher than shaping surface MP by a predetermined distance). That is, the liquid surface of cooling water CW is controlled in this manner, in response to the downward movement (and the progress of shaping) of stage 12. Note that position and attitude control of the object surface on the workpiece at the time of additive manufacturing is performed, taking into consideration the shape information on the object surface measured earlier.

Note that if additive manufacturing is possible without being affected by cooling water CW, the supply of cooling water CW does not have to be stopped. That is, the supply of the cooling water from outlet portion 20 may be performed, concurrently with the additive manufacturing.

Here, in the description above, shaping accompanied with scanning operation of stage 12 is to be performed presupposing that object surface (e.g., upper surface) TAS on which target portion TA of additive manufacturing of workpiece W is set is a surface set to a surface (a surface parallel to the XY plane) perpendicular to the optical axis of condensing optical system 82, by adjusting the tilt of stage 12.

When shaping of the $N^{th}$ layer is completed, the first flow control valve 18A is fully opened by controller 600, and cooling water CW within tank 13 is drained outside via drain pipe 16. After the drainage has been completed, by stage 12 being moved by controller 600 in a direction moving away from drain pipe 16 fixed to a predetermined position, engagement between the first member 15a and the second member 15b of connector 15 is canceled, and drain pipe 16 is detached from stage 12. Then, stage 12, on which workpiece W having completed additive manufacturing is mounted, is moved by controller 600 to the loading/unloading position previously described.

Next, controller 600 gives instructions to workpiece carrier system 300 to unload the workpiece. In response to the instructions, workpiece W on which additive manufacturing has been completed is taken out from stage 12 (table 12a) by workpiece carrier system 300, and is carried outside shaping system 100. Then, instructions are given to robot 14 from controller 600, and stage 12 is set to the reference state.

In this manner, moving apparatus 200 is to wait at the loading/unloading position in preparation for delivery of the next workpiece.

Note that while the example was described so far of adding a shape to an existing workpiece, the usage of shaping system 100 according to the embodiment is not limited to this, and it is also possible to generate a three-dimensional shape by shaping on stage 12 where nothing exists, similarly to an ordinary 3D printer. This case is none other than applying additive manufacturing to a workpiece called "nothing". On shaping of a three-dimensional shaped object on such stage 12, controller 600, by optically detecting alignment mark in at least three places formed in advance on stage 12 by mark detection system 56 (refer to FIG. 6) that measurement device 400 is equipped with, obtains position information in directions of six degrees of freedom of the object surface of shaping set on stage 12, and can perform three-dimensional shaping of each layer in a manner similar to the embodiment described above by scanning and movable stage 12 with respect to beams $LB_1$ and $LB_2$ in the local non-liquid-immersion state described earlier, while controlling the position and attitude of the target surface on stage 12 (table 12a) with respect to (the irradiation area of) the beam based on the results.

As is described in detail so far, with shaping system 100 according to the embodiment, by controller 600 supplying shaping material DP irradiated by the beams while the beams and object surface TAS are relatively moved, moving apparatus 200, beam irradiation section 520, and material supplying section 530 are controlled based on data on stacked-layer cross sections of multiple layers, so that shaping is applied to target portion TA in a partial area which is to be in a non-liquid-immersion state on object surface TAS of workpiece W arranged within tank 13. That is, in this manner, additive manufacturing by three-dimensional shaping or making of a workpiece by three-dimensional shaping to workpiece W is performed in a local non-liquid-immersion method.

Also, with shaping system 100 according to the embodiment, while object surface TAS (stage 12) is driven downward by one layer by controller 600 each time the shaping of each layer is completed, each time when the downward drive is performed in conjunction with stage 12 moving downward, cooling water CW within tank 13 is to be adjusted so that the liquid surface of cooling water CW within tank 13 becomes slightly higher than the upper surface of the top layer on which shaping has been completed. That is, adjustment of the liquid surface of cooling water CW within tank 13 is performed in conjunction with the downward drive of stage 12 and progress of shaping in this manner, and the entire workpiece W is covered with the cooling water at all times, except for a part of the local non-liquid-immersion area including the target portion. Accordingly, it becomes possible to effectively suppress warping and the like from occurring in the workpiece caused by uneven temperature of the workpiece during the shaping processing. This is highly useful, especially in the case of a thin workpiece.

Also, with shaping system 100, powdered shaping material (metal material) PD supplied by material supplying section 530 is melted by the energy of the laser beam. With shaping system 100, on shaping, gas supply apparatus 40 operates under the control of controller 600 and nitrogen (inert gas) is sent inside cover member 30 via gas supply port 42a of gas supply pipe 42 so that a spiral swirling flow (refer to code SF in FIG. 5) is generated along inner surface 30c of cover member 30. By this swirling flow of nitrogen (inert gas), powdered shaping material PD which is supplied by being dropped directly down from supply pipe 84 is narrowed corresponding to the shape of inner surface 30c (inner wall surface) of cover member 30 toward the bottom (when approaching the tip of cover member 30). This allows powdered shaping material PD supplied from supply pipe 84 to be converged to almost one point (here, a point on optical axis AX), and by melting shaping material PD with beams $LB_1$ and $LB_2$, making of a three-dimensional shaped object with excellent shaping accuracy and high resolution secured becomes possible.

Also, with shaping system 100, shaping in the local non-liquid-immersion state described above is realized in the following manner. That is, with shaping system 100, after swirling flow SF described above is generated, the inert gas jetting out from outlet 30b which is the tip of cover member 30 is supplied toward target portion TA. By increasing the flow speed of the inert gas supplied to this target portion TA, the flow or the inert gas can blow away cooling water CW existing on a partial area on object surface TA including target portion TA. By this operation, the partial area including target portion TA is set locally to a non-liquid-immersion state (dry state), and shaping using shaping material PD with respect to target portion TA is performed in the non-liquid-immersion state. Accordingly, shaping or making of a three-dimensional shaped object with excellent shaping accuracy and high resolution secured becomes possible, without being affected by the cooling water.

Also, with shaping head section 500 according to the embodiment, since condensing optical system 82 with high N.A. is structured by one or a plurality of large-diameter lenses, the size of the area on the incident plane can be increased, which allows more amount of light energy to be taken in than in the case of using a condensing optical system that has a small N.A. Accordingly, the beam condensed by condensing optical system 82 according to the embodiment is to have an extremely sharp and high energy density, which can increase processing accuracy by shaping. Also, when the total amount of energy that condensing optical system 82 takes in increases, the energy of the beam emitted from condensing optical system 82 becomes larger, and this leads to the amount of metal that can be melted per unit time being increased. This improves throughput of shaping processing by shaping head section 500, if supply amount of the shaping material and the speed of stage 12 are increased.

Also, with shaping head section 500 according to the embodiment, the intensity distribution of the beam on shaping surface MP can be set or changed, for example, by controlling incidence angle distribution of a plurality of parallel beams incident on condensing optical system 82.

Accordingly, with shaping system 100, it becomes possible to form a shaped object on object surface TAS of workpiece W, for example, by rapid prototyping, with high processing accuracy.

Note that in the embodiment above, while the case has been described in which tank 13 is provided on stage 12 and liquid is supplied into tank 13 in order to supply cooling water CW (liquid) on object surface TAS, the supply method of liquid onto the object surface is not limited to this.

Also, with shaping system 100 according to the embodiment above, the case has been described in which inert gas (gas) is supplied to the first space 30*a* within cover member 30 via gas supply port 42*a* of gas supply pipe 42 connected to conical cover member 30 at the time of shaping so that spiral swirling flow SF occurs along inner surface 30*c* of cover member 30, and after the inert gas becomes a swirling flow, the gas is made to flow out outside of the first space 30*a*. With shaping system 100 according to the embodiment described above, a partial area including target portion TA is set locally to a non-liquid-immersion state at the time of shaping, using the inert gas supplied from outlet 30*b* of cover member 30. In this case, a plurality of openings may be formed in cover 30, and gas supply pipe 42 may be connected individually to each of the openings. In this case, the plurality of openings may be formed, for example, so that each of the gas supply pipes 42 can be connected at positions where the center angle become an equal angle interval on the circular bottom surface (a surface on the upper side in FIG. 5) of cover member 30. In this case, by supplying nitrogen in the tangential direction of cover member 30 from each of the gas supply ports 42*a* of the plurality of gas supply pipes 42, a swirling flow may be generated in the same rotating direction (clockwise or counterclockwise).

Note that inert gas (gas) may be supplied or jet toward target portion TA via the inner space of cover member 30, without swirling flow SE being generated, different from the embodiment described above. With the cover member, as long as the member is a member that has a shape including a curved surface in a part of the shape converged toward the outlet 30*b* side from a side opposite to outlet 30*b* in the Z-axis direction (a direction parallel to optical axis AX), such as for example, a member having a conical or an elliptical cone shaped inner surface, the outer shape may be of any shape. Also, the shaping system does not have to be equipped with the cover member. For example, the shaping system does not have to be equipped with the cover member as long as the inert gas (gas) can be supplied to a partial area including target portion TA.

Note that with shaping system 100 according to the embodiment described above, the case has been described in which with shaping head section 500, a lens (hollow lens) which has a through hole penetrating in an optical axis direction in the center including optical axis AX is used as terminal lens 82*a* of beam irradiation section 520, material supplying section 530 is inserted into the through hole of terminal lens 82*a* and has supply pipe 84 which supplies the shaping material along optical axis AX, and beam irradiation section 520 irradiates beams along an optical path tilted with respect to optical axis AX via inner space 30*a* of cover 30 on the shaping material supplied to target portion TA from supply pipe 84. Such a structure was employed because condensing optical system 82 of beam irradiation section 520 has a large diameter, low aberration, and high N.A., and the point was taken into consideration in which a beam spot can be formed, for example, only by light passing near the periphery of the same condensing optical system 82, which allows a beam spot of a quality higher than that of when a beam spot (laser spot) is formed by condensing light via separate optical systems on the same area. Accordingly, as a matter of course, the terminal lens does not have to be a hollow lens.

Figure 7:
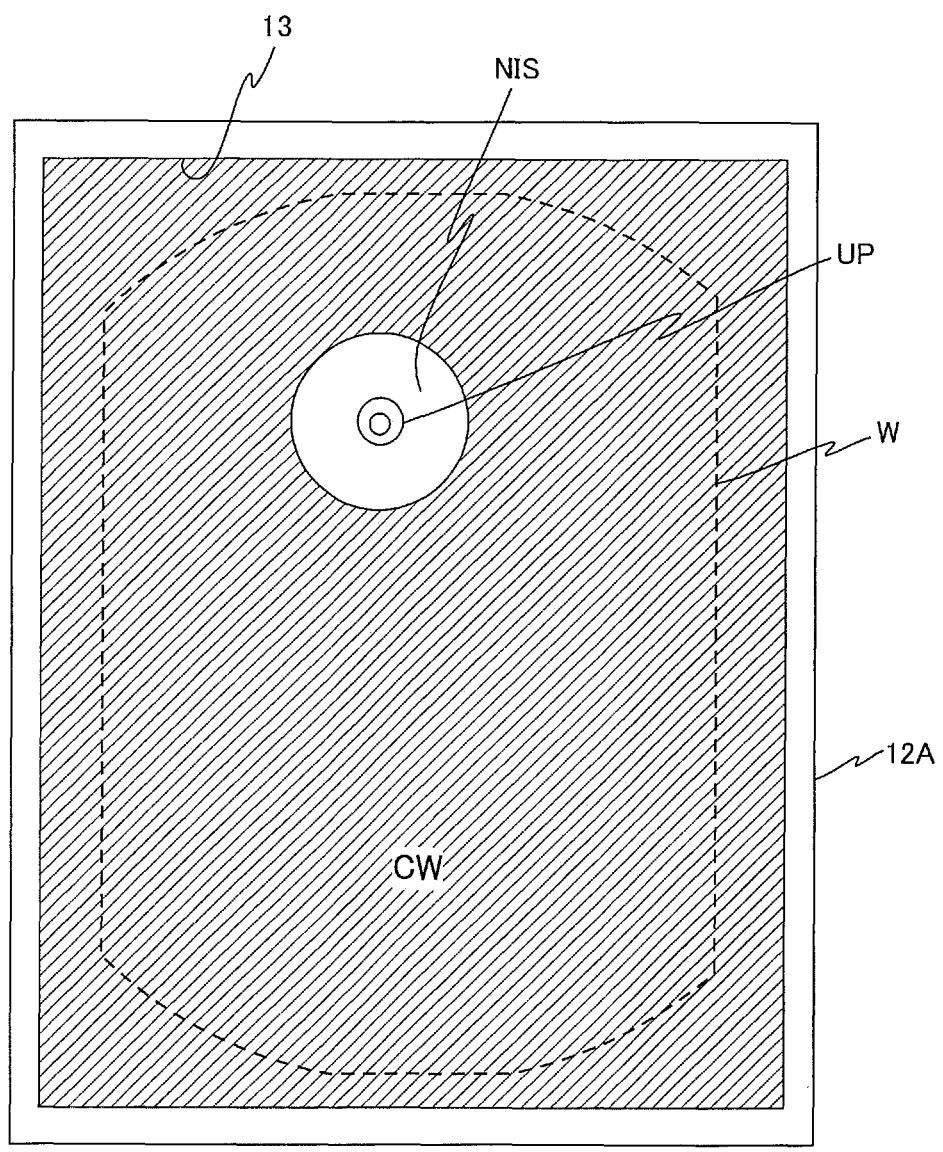
FIG. 7 is a view used to explain a case in which a target portion is set on an uneven portion where it is not flat on the workpiece.

Note that in the embodiment above, while the description was made of object surface (e.g., upper surface) TAS on which target portion TA for additive manufacturing of workpiece W being a surface set to a surface (a surface parallel to the XY plane) perpendicular to the optical axis of condensing optical system 82 by adjusting the tilt of stage 12, target portion TA actually is not always set on a surface, especially in the case of additive manufacturing. That is, a case can be considered when target portion TA is set to an uneven portion which is not flat on workpiece W, however, even in such a case, a partial area on workpiece W including such an uneven portion UP can be set to a local non-liquid-immersion area NIS as is shown in FIG. 7 similarly in the manner described earlier, which allows a similar shaping processing to be performed.

Figure 8:
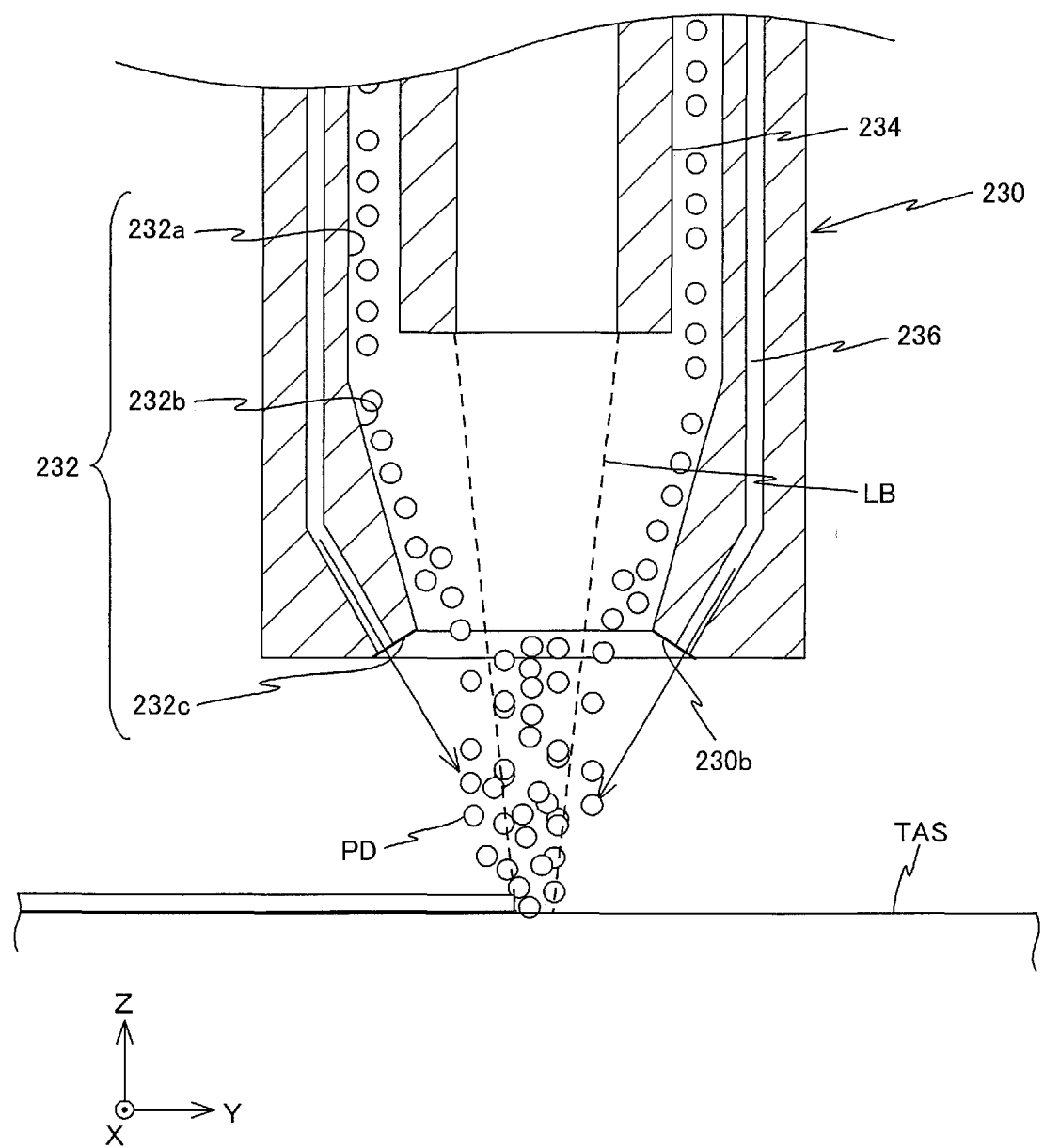
FIG. 8 is a view showing a cover member according to a modified example which is used in the shaping head section of a type that irradiates a beam along an optical axis of a beam irradiation section and supplies shaping material along a path tilted with respect to the optical axis.

Also, the shaping head section is not limited to the structure described in the embodiment above. The shaping head section may be of a type, for example, that irradiates a beam along an optical axis of a beam irradiation section and supplies shaping material along a path tilted with respect to the optical axis. In the case of employing a shaping head section of this type, as a cover member, for example, a cover member 230 shown in FIG. 8 can be used. Cover member 230 has a cylindrical shape as a whole, and at its lower end portion in FIG. 8, has an outlet 230*b* which functions as an outlet of the beams, an outlet of the shaping material, and an outlet of the inert gas. To describe this furthermore in detail, in cover member 230, an opening section 232 (inner space) is formed from the lower end surface in FIG. 8 to the vicinity of the upper end surface (a position a predetermined distance below the upper end surface), and opening section 232 has a first part 232*a*, a second part 232*b*, and a third part 232*c* that each consist of an inner peripheral surface whose center is the axis of the cylinder of cover member 230. The first part 232*a* is located at the top and consists of the inner peripheral surface of the cylindrical surface shape extending in the vertical direction. The second part 232*b* consists of a tapered inner peripheral surface (a part of a conical surface) continuously extending below the first part 232a. The third part 232c communicates with the second part, and consists of a tapered inner peripheral surface (a part of a conical surface) which reaches the lower end surface of cover member 230. The second part 232b has a diameter which becomes smaller when it nears the third part 232c. Meanwhile, the third part 232c, on the contrary, has a diameter which becomes larger when moving farther away from the second part 232b. Outlet 230b is formed by the opening at the lower end of the third part 232c and the second part 232b of opening 232.

Inside the first part 232a of opening section 232, abeam light-emitting section 234 of a cylindrical shape which is one size smaller than the first part 232a is provided, extending in the vertical direction. The inside of beam light-emitting section 234 is a path for beam LB. Also, space between beam light-emitting section 234 and the first part 232a of opening section 232 is a part of a supply path for shaping material PD. Shaping material PD is supplied to the target portion below cover member 230 from a direction tilted by a predetermined angle with respect to the optical axis of the beam irradiation section from outlet 230b, via a space between beam light-emitting section 234 and the first part 232a and (the inner space of) the second part 232b of opening section 232 below.

In cover member 230, furthermore, a pair of inert gas supply paths 236 is formed on the outer side of the first part 232a and the second part 232b of opening section 232. Supply path 236, for example, is formed in an arcuate shape in a sectional surface perpendicular to the Z-axis, and the lower end opens to a part of the inner peripheral surface of the third part 232c of opening section 232. In the case of using cover member 230, a condensing optical system that has a smaller N.A. than condensing optical system 82 described earlier is used in the shaping head section, and as the terminal lens of the condensing optical system, a normal lens is used which is not a hollow lens.

Note that in the embodiment above, while the case has been described in which a partial area including target portion TA is set to a non-liquid-immersion state by supplying inert gas toward object surface TAS to which cooling water CW is supplied, the method to set a partial area on object surface TAS to a non-liquid-immersion state is not limited to this. For example, a partial area on object surface TAS can also be set to a non-liquid-immersion state by cooling water CW being suctioned. For example, with shaping head section 500 in the first embodiment, a cover member 330 shown in FIG. 9 may be used, instead of cover member 30 described earlier. Cover member 330 consists of a columnar member which has a conical inner surface 330c, and has an outlet 330b at the lower surface which has a role equivalent to outlet 30b of cover member 30 described earlier, and at a position on the outer side of outlet 330b at the lower surface, a gas supplying port 332 is formed, consisting of a loop shaped (e.g., a ring-shaped) recess section which surrounds outlet 330b Also, to outlet 330b at the lower surface of cover member 330 on the outer side of gas supplying port 332, a suction port 334 is formed consisting of a loop shaped (e.g., a ring-shaped) recess section which is one size larger than gas supplying port 332. Suction port 334 is connected to a suction device such as a vacuum pump and the like (not shown), via a suction path (not shown). Also, gas supplying port 332 is connected to a gas supply apparatus (not shown), via a supply path (not shown). The gas supply apparatus may jet out the inert gas out downward from gas supplying port 332, or may blow out gas other than the inert gas, such as, for example, compressed air. By generating negative pressure within the suction path with the suction device, cooling water CW, gas jetting out from gas supplying port 332 (and inert gas flowing out from outlet 330b) and the like are suctioned into the suction path via suction port 334, and are exhausted outside. As a consequence, a non-liquid-immersion space NIS where liquid does not exist is formed (refer to FIG. 9) below cover member 330. Note that instead of ring shaped gas supplying port 332, a plurality of gas supplying ports may be arranged in a ring shape. Also, instead of ring shaped suction port 334, a plurality of suction ports may be arranged in a ring shape.

Note that if the thickness of the liquid layer between the upper surface of workpiece W and the lower surface of cover member 330 is thin enough, only one of suction port 334 and gas supplying port 332 may be provided in cover member 330. Also, jetting of inert gas from outlet 330b may also be, or not be performed together.

Note that in addition to, or instead of outlet portion 20, the supplying port of cooling water CW may be provided in stage 12 (e.g., frame member 12b). In this case, the supply pipe connected to the supplying port of cooling water CW may be freely detachable similarly to drain pipe 16, or the supply pipe may be connected at all times to stage 12.

Also, an exhaust pipe (drainage pipe) may be arranged above stage 12 in addition to, or instead of the drainage pipe connected to the hole in stage 12, and the liquid drainage may be performed via the tip (an exhaust port) of the exhaust pipe arranged within tank 13. In this case, the exhaust pipe may, or may not be movable.

Also, in addition to, or instead of outlet portion 20, a supplying port of cooling water CW may be provided in cover members (30, 230, and 330).

Also, in the embodiment described above, while cooling water CW is supplied so that cooling water CW comes into contact with object surface TAS, the supply may be performed so that cooling water CW does not come into contact with object surface TAS. Even if cooling water CW is not in contact with object surface TAS, an effect of suppressing warp, deformation and the like of workpiece W can be expected as long as cooling water CW is in contact with the outer surface other than object surface TAS of workpiece W.

Also, tank 13 (frame member 12b) does not have to be provided in stage 12. In this case, a mechanism may be provided below stage 12 for recovering cooling water CW flowing down from stage 12. Also, in this case, drain pipe 16 does not have to be connected to stage 12.

Also, cover members (30, 230, and 330) may be relatively movable with respect to barrel 85.

Note that in the embodiment above, while the case has been described of using mirror array 80 as the spatial light modulator, instead of this, a digital mirror device consisting of multiple digital micromirror devices (Digital Micromirror Device: DMD (registered trademark)) made based on MEMS technology that are arranged in a matrix shape to form a large area may be used.

Note that in the embodiment above, while the case has been described where the intensity distribution of the beam on the shaping surface is changed by individually controlling the incidence angle of the plurality of parallel beams incident on the pupil plane of condensing optical system 82, not all incidence angles of the plurality of parallel beams incident on the pupil plane of condensing optical system 82 have to be controllable (changeable). Accordingly, in the case such as controlling the incidence angle of the parallel beam incident on condensing optical system 82 using the mirror array similar to the embodiment described above, the state of the reflection surface (at least one of position and tilt angle of the reflection surface) does not have to be variable in all mirror elements. Also, the reflection type spatial light modulator described above which can be used for controlling the incidence angle of the plurality of parallel beams incident on condensing optical system 82 is not limited to the mirror array described above. As a reflection type spatial light modulator which can be used, for example, a reflection type liquid crystal display device, an electrophoretic display (EPD: Electro Phonetic Display), electronic paper (or electronic ink), a diffraction type light valve (Grating Light Valve) and the like can be given.

Also, changing the intensity distribution of the beam on the shaping surface may be performed by changing the opening (size, shape, and number) of the mask arranged on the incidence plane side of the condensing optical system (projection optical system). In this case, a mask may be arranged on the object plane of the condensing optical system, and an image plane or the vicinity may serve as the shaping surface. Also, in this case, the beam intensity distribution on the pupil plane of the condensing optical system, the terminal lens of the condensing optical system may be made into a hollow lens, for example, by changing the shape to an annular shape, or by arranging a light shielding member which shields light in a circular area including the optical axis on the pupil plane.

Also, as is described above, while it is desirable for condensing optical system 82 to have a large diameter, a condensing optical system with a numerical aperture N.A. smaller than 0.5 may also be used.

Also, in the embodiment above, to control the intensity distribution of the beam, shaping system 100 may be equipped with a sensor that can have the light receiving section arranged in or close to the rear focal plane of condensing optical system 82. For example, it is desirable that a CCD image sensor is loaded on stage 12 and the CCD image sensor calibrates the intensity distribution (intensity distribution within the irradiation area in the shaping surface) of the beam at a proper frequency. As is described, by measuring the intensity distribution of the beam using the sensor that receives the beam from condensing optical system 82, the intensity distribution of the beam can be controlled considering variation factors such as thermal aberration of condensing optical system 82. Also, by controlling mirror array 80 based on the results, the intensity distribution of the beam in the rear side focal plane and the like of condensing optical system 82 can be set with good precision to a desired state. Also, this sensor may be used to control the position of the beam on the reference coordinate system.

Note that in the embodiment above, although examples were given of the case where titanium and stainless steel powder were used as shaping materials, not only iron powder or other metal powder as a matter of course, but also powder other than metal such as powdered nylon, polypropylene, ABS and the like can also be used.

Second Embodiment

Next, a second embodiment will be described, based on FIGS. 10 to 12. Here, as for component parts identical or equivalent to those in the first embodiment described earlier, identical reference numerals will be used and the description thereabout will be omitted.

Also, various modified examples described in the first embodiment can be applied to the second embodiment.

Figure 10:
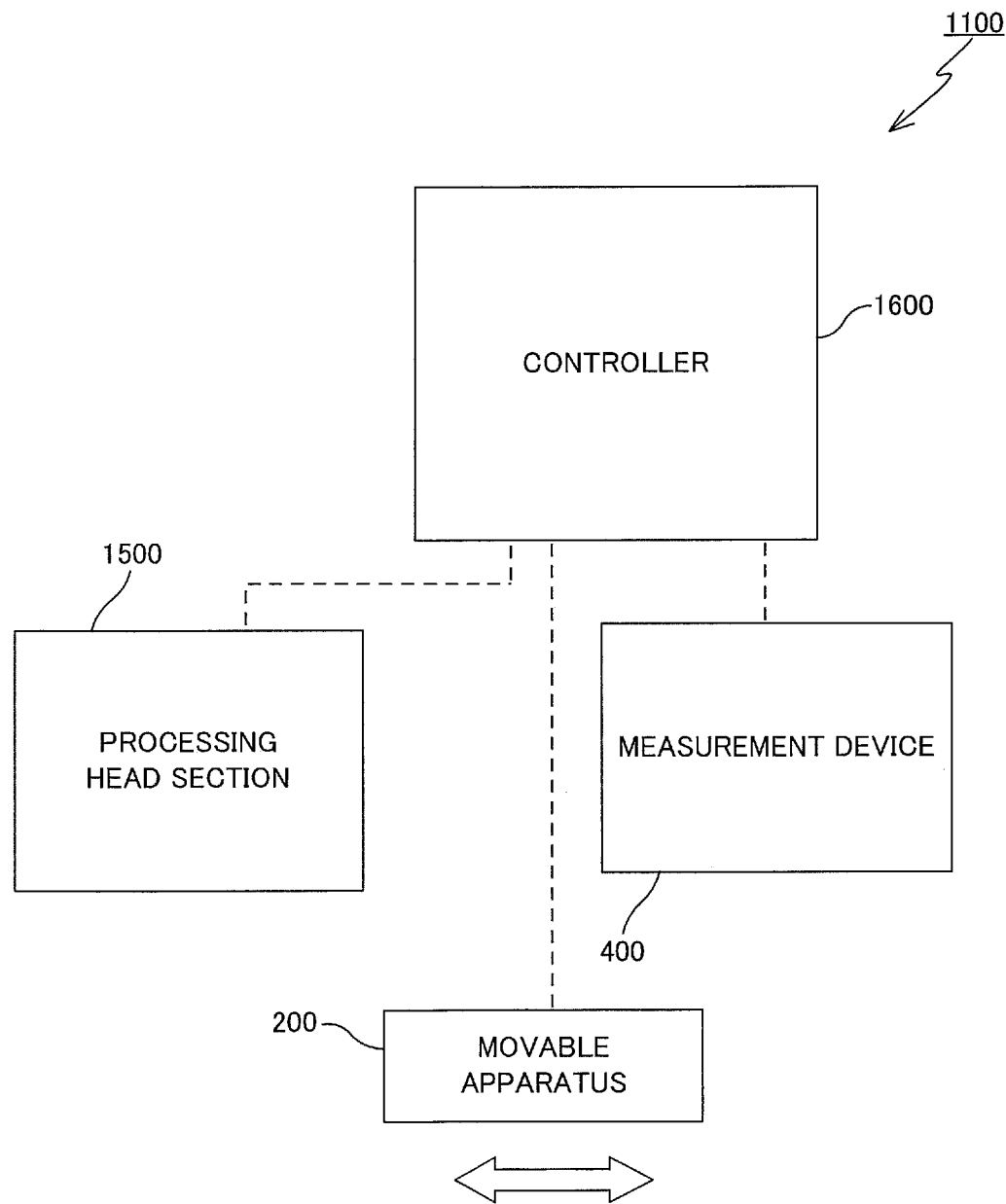
FIG. 10 is a block diagram showing an overall structure of a processing system according to a second embodiment.

FIG. 10 shows a block diagram of an entire structure of a processing system 1100 according to the second embodiment.

Processing system 1100 is a system that irradiates a laser beam (hereafter referred to as a beam) on a processing object (also called a workpiece) and performs various removal processing such as, for example, grinding processing, cutting processing, or piercing processing and the like.

Processing system 1100 is equipped with moving apparatus 200, measurement device 400, a processing head section 1500, and a controller 1600 which controls the whole processing system 1100 including each of these parts. Measurement device 400 and processing head section 1500 are arranged separately from each other in a predetermined direction (X-axis direction, refer to FIG. 11). That is, with processing system 1100 according to the second embodiment, processing head section 1500 is provided instead of shaping head section 500 that shaping system 100 according to the first embodiment described earlier is equipped with, and controller 1600 is provided instead of controller 600. Note that moving apparatus 200 in processing system 1100 is freely movable in stage 12 (refer to FIG. 11) between measurement device 400 and processing head section 1500 shown in FIG. 10, and a workpiece carrier system 300 (not shown in FIG. 10, refer to FIG. 12).

Figure 11:
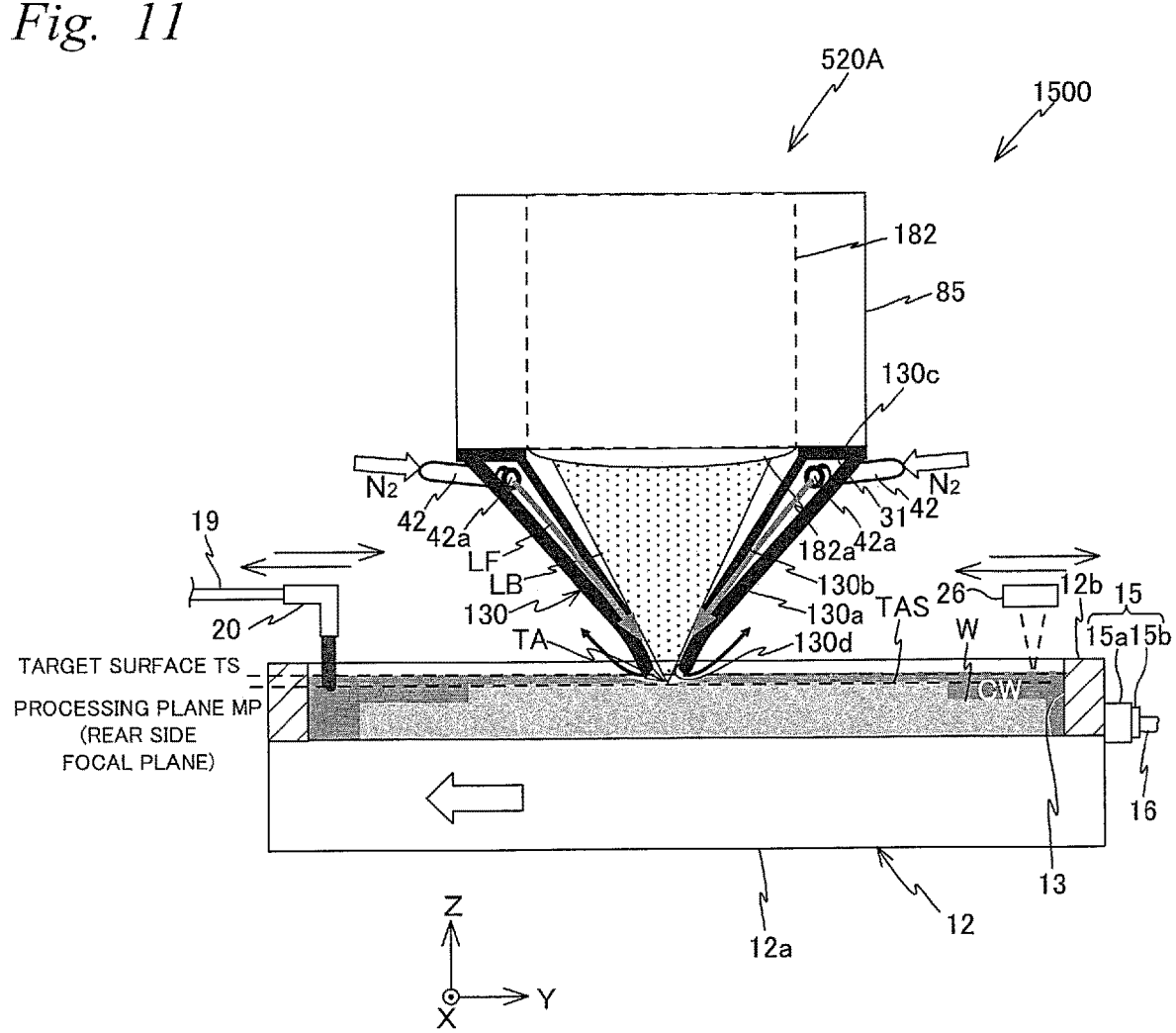
FIG. 11 is a view showing a condensing optical system of a processing head section that the processing system is equipped with and a part below, along with a stage.

FIG. 11 shows a condensing optical system 182 which structures a part of a beam irradiation section that processing head section 1500 is equipped with, and a cover member 130 which is fixed in a suspended state to the lower end of barrel 85 that holds condensing optical system 182, along with stage 12 that moving apparatus 200 is equipped with. In processing system 1100 as well, drain pipe 16 is freely detachable via connector 15 to frame member 12b (divides tank 13) of stage 12, similarly to shaping system 100 described earlier. In drain pipe 16, the first flow control valve 18A (not shown in FIG. 11, refer to FIG. 12) is provided, and the first flow control valve 18A is controlled by controller 1600 (refer to FIG. 12).

Figure 12:
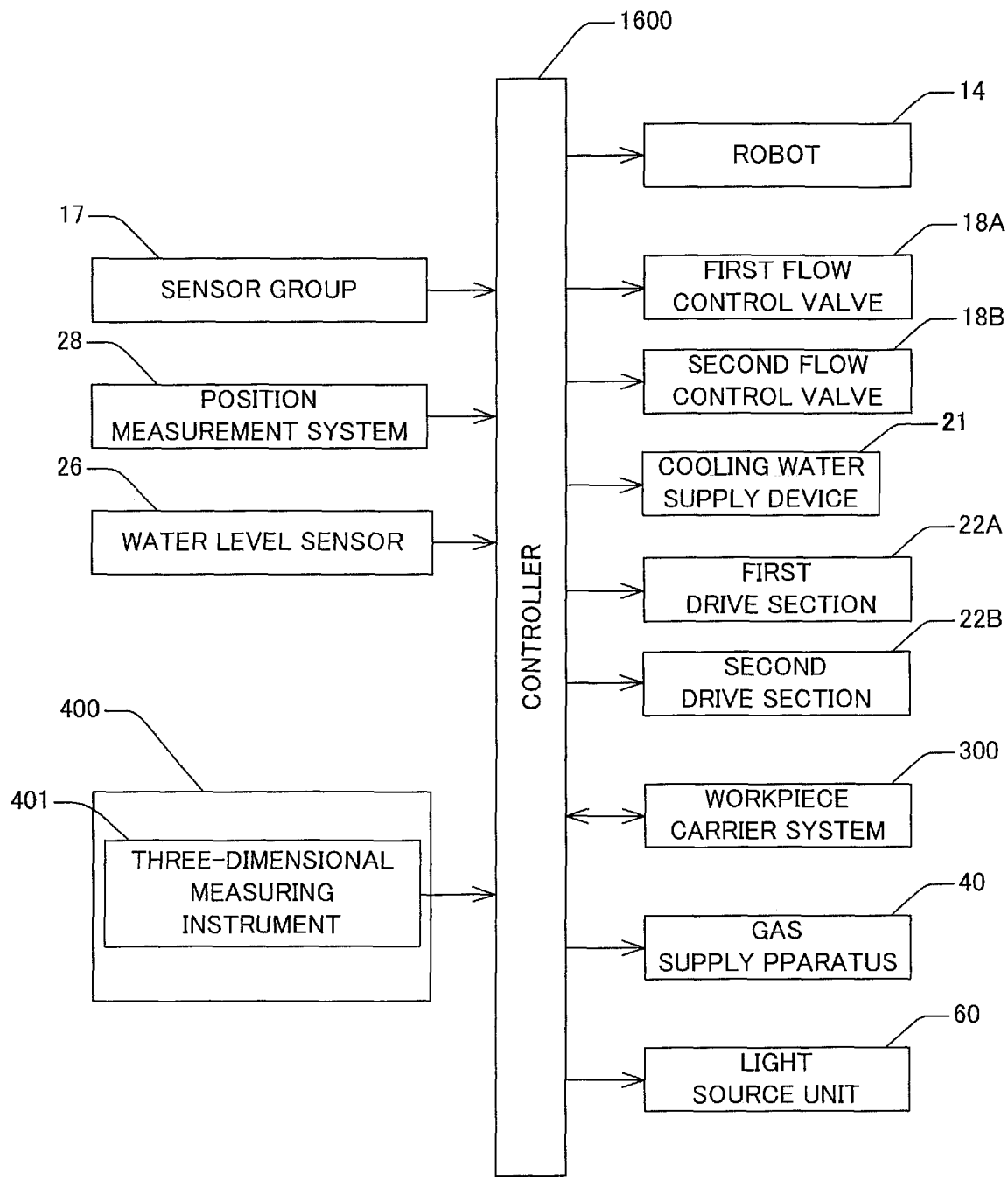
FIG. 12 shows a block diagram that indicates an input/output relation of a controller which mainly structures a control system of the processing system.

Also, in processing system 1100, similarly to shaping system 100 described earlier, near processing head section 1500, an outlet portion 20 is arranged provided at a position of a predetermined height on a side at one end of water supply pipe 19, and outlet portion 20 is movable back and forth along the Y-axis direction by the first drive section 22A (not shown in FIG. 11, refer to FIG. 12). To the other end of water supply pipe 19, cooling water supply device 21 (not shown in FIG. 11, refer to FIG. 12) is connected that includes the liquid tank which stores cooling water inside. Also, in water supply pipe 19, the second flow control valve 18B (refer to FIG. 12) is provided. The second flow control valve 18B operates under the control of controller 1600.

Also, near processing head section 1500, water level sensor 26 which detects the level (water level) of water surface (liquid surface) of cooling water CW in tank 13 is provided at a position of a predetermined height. Water level sensor 26 is movable back and forth along the Y-axis direction by the second drive section 22B (not shown in FIG. 11, refer to FIG. 12).

In the second embodiment, at the time of processing of the workpiece, the first drive section 22A and the second drive section 22B are controlled by controller 1600 when necessary, and by this control, outlet portion 20 and water level sensor 26 are moved in the Y-axis direction linked with a change of position in the Y-axis direction of stage 12.

Also, in the embodiment, at the time of processing of the workpiece, the first flow control valve 18A and the second flow control valve 18B are controlled by controller 1600 based on measurement information of water level sensor 26 similarly to the first embodiment described above, so that the water surface of cooling water CW is to be located at all times at a position slightly higher than the upper surface of workpiece W mounted on stage 12 (table 12*a*). Controller 1600 sets in advance target surface TS (refer to FIG. 11) to which the liquid surface of the cooling water should be positioned at a position higher by only a predetermined distance than a surface (hereinafter called a processing surface) MP to which object surface TAS (usually the upper surface of workpiece W that faces a beam irradiation section 520A) where the target portion of workpiece W is set should be positioned. Then, controller 1600 obtains a difference between thee actual liquid surface and target surface TS based on measurement information of water level sensor 26, and controls the degree of opening of the second flow control valve 18B and the first flow control valve 18A to make the difference be zero. This allows the liquid surface of cooling water CW to be adjusted (set) to be higher by a predetermined distance than object surface TAS positioned to processing surface MP during processing at all times, in conjunction with the change of position in the Z-axis direction of object surface TAS of the workpiece on stage 12 and the progress of processing. Note that in the description below, the upper surface of workpiece W will also be referred to as an upper surface TAS or object surface TAS.

Processing head section 1500 is equipped with beam irradiation section 520A.

Condensing optical system 182 is an optical system which has a high N.A., e.g., 0.5 or more, preferably 0.6 or more and low aberration. Condensing optical system 182 has a plurality of lenses including terminal lens 182*a* that are each held by barrel 85. As terminal lens 182*a*, a normal convex lens is used which is not a hollow lens.

Also, with processing system 1100, intensity distribution of a beam on processing surface MP during relative movement of the beam and workpiece W is changeable, such as, for example, at least one of a shape, a size, and number of irradiation areas of the beam. In this case, controller 1600 can change the intensity distribution of the beam on processing surface MP continuously, or intermittently.

Cover member 130, as is shown in FIG. 11, has a first member 130*a* consisting of a hollow conical member, a second member 130*b* which is a slightly smaller truncated conical shape arranged on the inner side of the first member 130*a*, and an attachment section 130*c* which is a ring shape in a planar view that connects the first member 130*a* and the second member 130*b* at their bottom surface sides (surfaces on the upper side in FIG. 11). Attachment section 130*c* is made of a ring-shaped plate member whose inner diameter is smaller than the bottom surface of the first member 130*a* (slightly larger than the outer diameter of terminal lens 182*a*) and outer diameter is slightly larger than the bottom surface of cover member 130 (a surface on the upper side in FIG. 11). Cover member 130 has its base end (bottom surface side) fixed to the lower end surface of barrel 85, via attachment section 130*c*. At the tip portion of cover member 130 (the opposite side of the bottom surface), the tip opens slightly outward so that an outlet 130*d* of beam LB irradiated on the workpiece is formed at the tip. The inside of cover member 130 (the first member 130*a*) is divided into a conical inner space (the first space) and an outer space (the second space) on the outer side by the second member 130*b*. In the first space, the lower end portion of terminal lens 182*a* is exposed. The second space is a space whose cross sectional surface parallel to the XY plane has a ring shape in a planar view, and the inner diameter, the outer diameter, and the width of the ring gradually become smaller from the +Z side toward the −Z side.

Gas supply apparatus 40 (refer to FIG. 12) is connected to the first member 130*a*, and gas supply pipe 42 which supplies nitrogen that is a kind of inert gas to the second space inside cover member 130 from gas supply port 42*a* is connected to a plurality of places. Note that as the inert gas, instead of nitrogen, rare gas (e.g., helium (He), Neon (Ne), Argon (Ar) and the like) may be used. Gas supply pipes 42, shown in FIG. 11, are each connected from the outside in a state where one end of gas supply port 42*a* is exposed in the second space, near the upper end portion of the first member 130*a* of cover member 130. Each of the plurality of gas supply ports 42*a* are provided, for example, at positions where the center angle becomes an equal angle interval on the circular bottom surface (a surface on the upper side in FIG. 11) of the first member 130*a*.

In the operating state of the gas supply apparatus, nitrogen (inert gas) is supplied substantially along the inner surface of a conical surface shape of the first member 130*a* into the second space, via gas supply ports 42*a* of each of the plurality of gas supply pipes 42, and the nitrogen which has been supplied becomes a linear converged flow that heads downward from above along the inner surface of the first member 130*a* as is shown in an arrow with a reference code LF in FIG. 11, and jets out outside of cover member 130 via outlet 130*d*. Gas supply apparatus 40 according to the second embodiment can adjust the temperature, flow speed and the like of the inert gas sent into the second space of cover member 130.

Now, as is obvious from the description of adjusting the cooling water amount within tank 13 described earlier, on the processing process, the liquid surface (water surface) of cooling water CW is set to a position slightly higher than object surface TAS of workpiece W. However, when cooling water exists at a place on target portion TA, cooling water CW may have an adverse effect and the processing accuracy secured may not be sufficient. Therefore, in processing system 1100, as is shown in FIG. 11, inert gas of high speed jetting out from outlet 130*d* at the tip of cover member 130 is supplied toward target portion TA, and by the flow of the inert gas, cooling water CW that exists on a partial area on object surface TAS including target portion TA can be blown away and be removed. By this operation, the partial area including target portion TA is set locally to a non-liquid-immersion state (dry state), and in a state where object surface TAS contains both an area covered with the supplied cooling water CW and an area not covered with the supplied cooling water CW, irradiation of the beam on the target portion is performed, and the processing process on target portion TA is performed.

FIG. 12 shows a block diagram that indicates an input/output relation of controller 1600 which mainly structures a control system of processing system 1100. Controller 1600 includes a workstation (or a microcomputer) and the like, and has overall control over constituent parts of processing system 1100.

The basic function of processing system 1100 according to the embodiment structured in the manner described above is to perform various processing such as cutting, grinding, or piercing processing and the like on the processing object (workpiece). The workpiece is supplied to processing system 1100 and then is carried out from processing system 1100 after processing is performed. The series of operations performed in processing system 1100 is automated, and the workpiece can be fed in lot units, with a fixed quantity gathered on a pallet serving as one lot.

First of all, a pallet (not shown) on which one lot of the workpiece before processing is loaded, is carried in from the outside, into a predetermined carry-in/carry-out position in processing system 1100. This carry-in is performed by workpiece carrier system 300 in response to instructions from controller 1600. Here, one lot is, e.g., i×j, and i×j workpieces are loaded on the pallet in an arrangement of an i row j column matrix. That is, load position (mount position) of workpieces is fixed in an arrangement of an i row j column matrix on the upper surface of the pallet, and a workpiece is loaded (mounted) at each load position.

Next, the first workpiece in the lot is taken off from the pallet, and is loaded on stage 12 (table 12a). At this point, robot 14 is to be located at a loading/unloading position set near the position where workpiece carrier system 300 is set in processing system 1100. Also, at this time, stage 12 stage 12 is in the reference state (Z,θx, θy, θz)=(Z$_0$,0,0,0) described earlier, and the X, Y positions of stage 12 coincide with the X, Y positions of robot 14 measured by position measurement system 28. That is, stage 12 is at a reference point (x=0, y=0) which is defined on robot 14.

Next, stage 12 on which workpiece W is loaded is moved to an area below measurement device 400 by controller 1600. The movement of stage 12 is performed by controller 1600 controlling and driving robot 14 in the X-axis direction (and the Y-axis direction) on the floor surface, based on the measurement information of position measurement system 28. Stage 12 maintains the reference state previously described also during this movement.

Next, controller 1600 performs measurement of object surface TAS on workpiece W that is on stage 12 in the reference state, such as, for example, position information within a three-dimensional space (shape information in the embodiment) of at least a part of the upper surface, using measurement device 400. Hereinafter, it becomes possible to control the position in directions of 6-DOF of object surface TAS of workpiece W on the stage coordinate system (reference coordinate system) according to open loop control, based on the measurement results.

Next, controller 1600 moves stage 12, on which workpiece W having completed measurement of shape information on at least a part of object surface TAS is mounted, toward an area below processing head section 1500. On this operation, the first flow control valve 18A and the second flow control valve 18B are in a fully closed state.

When stage 12 moves along a predetermined route and reaches a predetermined position below processing head section 1500, the second part 15b of connector 15 connected to one end of drain pipe 16 is attached to the first part 15a provided at stage 12 similarly to the description earlier, and one end of drain pipe 16 is connected to tank 13 (stage 12).

Next, cooling water CW is supplied into tank 13 until the liquid surface (water surface) coincides with target surface TS (refer to FIG. 11) by controller 1600. This supply of cooling water CW is realized by controller 1600 performing opening/closing control of the second flow control valve 18B, while monitoring the measurement information of water level sensor 26, similarly to the description above.

Next, processing is performed on the workpiece on stage 12. This processing is performed in the following manner. That is, moving apparatus 200 and processing head section 1500 are controlled by controller 1600, and the processing of the workpiece in the local non-liquid-immersion state (refer to FIG. 11) described earlier is performed while stage 12 is being scanned in the scanning direction with respect to the beam. Here, position and attitude control of the object surface (and the target portion) on the workpiece at the time of processing is performed taking into consideration the position information (shape information in the embodiment) of the object surface measured in advance by measurement device 400.

Here, for example, while cutting processing, grinding processing, or piercing processing and the like of workpiece W is performed in processing system 1100, in some of these processing, workpiece W may be moved upward as processing proceeds, as a result of positioning target portion TA at all times to a focusing point of beam LB by condensing optical system 182 to realize processing of the workpiece with highly accuracy and high throughput. Therefore, in the embodiment, while stage 12 is moved upward (or moved downward) by robot 14 based on instructions from controller 1600 as the processing proceeds, according to this upward (or downward) move of stage 12, opening degree control (including opening and closing) of the second flow control valve 18B and the first flow control valve 18A is performed by controller 1600 based on the measurement information of water level sensor 26, and the amount of cooling water CW within tank 13 is adjusted so that the liquid surface (water surface) coincides with target surface TS (a surface higher than processing surface MP by a predetermined distance). That is, control of the liquid surface of cooling water CW is performed in this manner, according to the upward (or downward) move of stage 12 and the processing progress. Note that position and attitude control of the upper surface (object surface) TAS on the workpiece at the time of processing is performed, taking into consideration shape information of the object surface which has been measured earlier.

When processing on workpiece W is completed, the first flow control valve 18A is fully opened by controller 1600, and cooling water CW within tank 13 is drained outside via drainpipe 16. After the drainage has been completed, by stage 12 being moved by controller 1600 in a direction moving away from drain pipe 16 fixed to a predetermined position, drain pipe 16 is detached from stage 12, in the same manner as above. Then, in response to instructions from controller 1600, robot 14 moves to the loading/unloading position previously described, along with stage 12 on which workpiece W that has been processed is mounted.

Next, controller 1600 gives instructions to workpiece carrier system 300 to unload the workpiece mounted on stage 12. In response to the instructions (including information to specify the load position on the pallet of the workpiece that has been processed (here, the first workpiece in the lot))), workpiece W that has been processed is taken off from stage 12 and is returned to the mounting position specified on the pallet by workpiece carrier system 300.

Then, instructions are given to robot 14 from controller 1600, and stage 12 is set to the reference state. In this manner, moving apparatus 200 is to wait at the loading/unloading position in preparation for delivery of the next workpiece.

Hereinafter, similarly, the same processing is performed repeatedly on the second and succeeding workpieces W in the lot.

As is described so far, with processing system 1100 according to the second embodiment, controller 1600 makes beam LB emitted from beam irradiation section 520A move relatively with workpiece W, and controls the movement of workpiece W by moving apparatus 200 and the irradiation state of beam LB from the beam irradiation section 520, so that processing (e.g., cutting processing, grinding processing, piercing processing or the like) is applied to target portion TA which is to be in a non-liquid-immersion state on object surface TAS of workpiece W arranged within tank 13. That is, in this manner, processing is performed to workpiece W in a local non-liquid-immersion method.

Also, with processing system 1100 according to the second embodiment, as a result of controller 1600 performing processing of workpiece W, the position (height) in the vertical direction of the upper surface of workpiece W changes as the processing proceeds; however, the amount of cooling water CW is to be adjusted according to the change of position (height), so that the liquid surface of cooling water CW within tank 13 becomes slightly higher than the upper surface of the workpiece. That is, adjustment of the liquid surface of cooling water CW within tank 13 is performed in conjunction with the vertical movement of stage 12 and progress of processing in this manner, and the entire workpiece W is covered with the cooling water at all times, except for a part of the local non-liquid-immersion area including the target portion. Accordingly, it becomes possible to effectively suppress warping and the like from occurring in workpiece W caused by uneven temperature of workpiece W during the processing. This is highly useful, especially in the case of a thin workpiece.

Note that in the second embodiment above, while the case has been described in which tank 13 is provided on stage 12 and liquid is supplied into tank 13 in order to supply cooling water CW (liquid) on workpiece W, the supply method of liquid onto the object surface is not limited to this.

Also, with processing system 1100 according to the second embodiment, the case has been described in which inert gas (gas) is introduced into the second space inside cover member 30, via the plurality of gas supply ports 42*a* positioned inside cover member 130 (the first member 130*a*), so that flow LF is generated on a straight line that heads downward from above along the inner surface of the first member 130*a* and jets outside of cover member 130 to make a partial area including target portion TA at the time of processing be set locally to a non-liquid-immersion state. However, the second embodiment is not limited to this, and similarly to the first embodiment described earlier, inert gas (gas) may be jet on a partial area including target portion TA, after swirling flow SF is generated inside the cover member via the inner space of the cover member.

Also, with the cover member, while it is preferable for the member to be a member having a shape including a curved surface in a part of the shape converged toward the outlet 130*d* side from a side opposite to outlet 130*d* in the Z-axis direction (the direction parallel to optical axis AX), such as for example, a member having a conical or an elliptical cone shaped inner surface, the outer shape may be of any shape. Also, the shaping system does not have to be equipped with the cover member.

Figure 9:
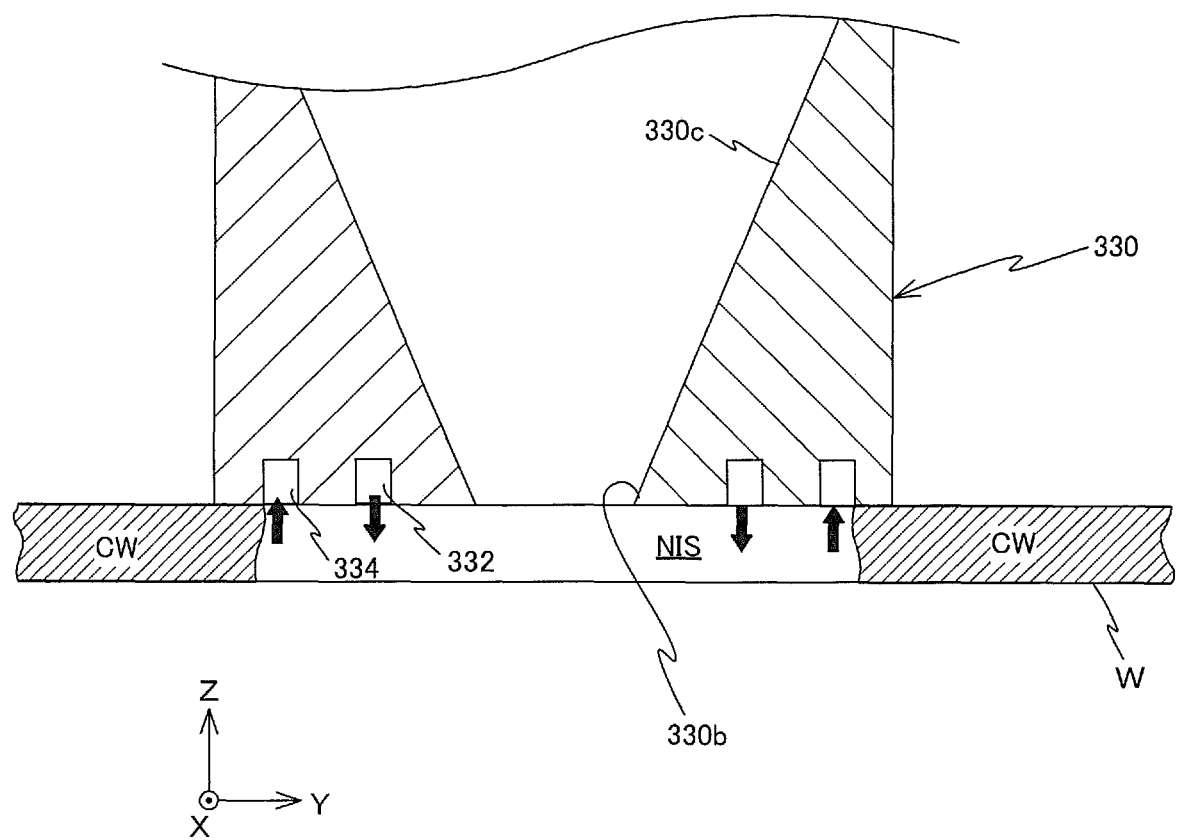
FIG. 9 is a view showing a cover member according to a modified example which can be used in the shaping head section in the first embodiment.

Note that also with processing system 1100 according to the second embodiment, a cover member in which a gas supplying port and a suction port are provided on the outer side of the outlet in the lower surface may be used, instead of cover member 130, similarly to cover member 330 shown in FIG. 9. This also allows a non-liquid-immersion space where there is no liquid to be formed below the cover member.

Note that while the description was made so far of forming a local non-liquid-immersion area in an partial area on the object surface by supplying or jetting an inert gas, or by supplying gas and/or suction of liquid and the like, it can also be said that to form the non-liquid-immersion area on the optical path and to generate a local non-liquid-immersion state on this optical path, is to perform processing of the liquid (cooling water CW) supplied on the object surface so that a gas space is made on the optical path of the beam. In this case, a beam is irradiated via the gas space on the target portion so that a predetermined processing such as the shaping processing or the processing process is applied to the target portion. That is, the beam is irradiated on the target portion without going through the liquid supplied. This can also be said that processing of the liquid supplied is performed so that the beam is to be irradiated on the target portion without going through the liquid supplied.

Note that while the case has been described so far in which a local non-liquid-immersion area is formed on the object surface or a gas space is formed on the beam optical path, by removing the liquid supplied onto the object surface using various methods described earlier. However, the description is not limited to this and the local non-liquid-immersion area on the object surface or the gas space on the beam optical path may be formed by limiting the liquid from entering a predetermined space. As an example, as for the first embodiment described above, the flow (jetting) of inert gas outside from the first space 30*a* may be started almost at the same time as when supply of the cooling water to tank 13 begins, and the flow (jetting) state of the gas may be maintained at all times until the shaping is completed, regardless of the time of shaping or the time of non-shaping. This allows cooling water CW to be supplied additionally in tank 13 when shaping of each layer has been completed and stage 12 is moved downward, and on this supply, cooling water CW can be limited in advance from entering a partial area on object surface TAS including target portion TA (and the optical path space of beams LB$_1$ and LB$_2$) at this point, so that the local non-liquid-immersion area or the gas space on the optical path can be formed.

Note that with shaping system 100 according to the first embodiment described above, while the case has been described as an example of controller 600 controlling each constituent part; moving apparatus 200, measurement device 400, and shaping head section 500, the embodiment is not limited to this, and the controller of shaping system 100 may be structured by a plurality of hardware that each includes a processing device such as a microprocessor. In this case, the moving apparatus 200, measurement device 400, and shaping head section 500 may each have a processing device, or the controller may be a combination of a first processing device that controls two of moving apparatus 200, measurement device 400, and shaping head section 500, and a second processing device that controls the remaining one system. In any case, the processing devices are each in charge of a part of the functions of controller 600 described above. Or the controller of the shaping system may be structured by a processing device such as a plurality of microprocessors and a host computer that has overall control over these processing devices.

Similarly, also in the second embodiment described above, the controller of processing system 1100 may be structured by a plurality of hardware that each includes a processing device such as a microprocessor. In this case, the moving apparatus 200, measurement device 400, and processing head section 1500 may each have a processing device, or the controller may be a combination of a first processing device that controls two of moving apparatus 200, measurement device 400, and processing head section 1500, and a second processing device that controls the remaining one system. In any case, the processing devices are each in charge of a part of the functions of controller 1600 described above. Or the controller of the processing system may be structured by a processing device such as a plurality of microprocessors and a host computer that has overall control over these processing devices.

Note that in the first embodiment, processing (e.g., removal processing such as cutting processing, grinding processing, and piercing processing) and the like may be performed by irradiating object surface TAS with a beam from beam irradiation section 520, without performing supply of powder serving as the shaping material. In this case, beam irradiation may be performed without performing powder supply, with the three-dimensional shaped object formed on stage 12 serving as a workpiece. Also, in additive manufacturing in which powder supply is performed, a non-liquid-immersion area may be formed and a beam from beam irradiation section 520 may be irradiated on workpiece W with without going through liquid (CW), and in processing in which powder supply is not performed (removal processing such as, e.g., cutting processing, grinding processing, and piercing processing), a beam from beam irradiation section 520 may be irradiated on a workpiece (W or a on a different workpiece) via liquid (CW).

Note that in the first and second embodiments described above, the systems do not have to be equipped with measurement device 400.

Also, in the first and second embodiments described above, while liquid (CW) supplied from outlet portion 20 is liquid for controlling the temperature of the object (workpiece W) which has object surface TAS or for cooling the object, the liquid may be used for other purposes, and the liquid may liquid other than water.

Also, in the first and second embodiments described above, while object surface TAS contains the liquid immersion portion and non-liquid-immersion portion, object surface TAS does not have to contain the liquid immersion portion. In such a case, liquid supply may be performed so that a surface other than object surface TAS of workpiece W comes into contact with liquid (CW).

Note that in addition to temperature adjustment/cooling by liquid (CW), or instead of temperature adjustment/cooling by liquid (CW), temperature adjustment/cooling of the workpiece may be performed using a cooling device such as a Peltier element.

Also, in the first and second embodiments described above, while target portion TA is made into a non-liquid-immersion state and irradiation of a beam is performed on target portion TA, a thin film of liquid (CW), drops of liquid or the like may exist on the portion where the beam is irradiated, as long as the level of liquid is kept to an extent which hardly affects the additive manufacturing and removal processing. This case may also be said to be a case in which a beam is irradiated without going through liquid.

Also, in each of the embodiments described above, while there are cases when the shape of the members, openings, and holes are described using terms such as circular and rectangular, it is needless to say that the shapes are not limited thereto.

Note that the disclosures of all publications of U.S. patent applications and the like cited in each of the embodiments above are incorporated herein by reference as a part of the present specification.

While the above-described embodiments of the present invention are the presently preferred embodiments thereof, those skilled in the art of shaping systems will readily recognize that numerous additions, modifications, and substitutions may be made to the above-described embodiments without departing from the spirit and scope thereof. It is intended that all such modifications, additions, and substitutions fall within the scope of the present invention, which is best defined by the claims appended below.

What is claimed is:

1. A processing method in which processing is applied to a target portion on a predetermined top surface by irradiation of a beam, comprising:
   supplying a liquid;
   separating via a liquid processing device the predetermined top surface into a first area with the supplied liquid and a second area with a non-liquid-immersion state in which the target portion is dry by removing the supplied liquid from the target portion on the predetermined top surface, the second area being a partial area including the target portion on the predetermined top surface; and
   irradiating a beam on the target portion in a state in which the non-liquid-immersion state is generated in the partial area including the target portion, so that the processing is applied to the target portion.

2. A processing system which processes a target portion on a predetermined top surface by irradiation of a beam, comprising:
   a liquid supply device which can supply liquid;
   a liquid processing device that is configured to separate the predetermined top surface into a first area with the supplied liquid and a second area with a non-liquid-immersion state in which the target portion is dry by removing the supplied liquid from the target portion on the predetermined top surface, the second area being a partial area including the target portion on the predetermined top surface;
   a beam irradiation section which emits a beam toward the target portion; and
   a moving apparatus which moves the predetermined top surface, wherein
   a beam is irradiated on the target portion in a state in which the target portion is in the non-liquid-immersion state, so that processing is applied to the target portion.

3. The processing system according to claim 2, wherein the beam is irradiated on the target portion without going through the liquid supplied.

4. The processing system according to claim 2, wherein the moving apparatus has a movable stage,
   the liquid supply device supplies the liquid to a container provided on the stage, and
   the processing is performed on the target portion on the predetermined top surface arranged within the container.

5. The processing system according to claim 4, wherein the liquid supply device includes an adjustment device which adjusts an amount of liquid in the container, the system further comprising:
   a controller which controls the amount of liquid in the container via the adjustment device.

6. The processing system according to claim 5, wherein the controller controls the adjustment device according to a change of position of the stage in a vertical direction.

7. The processing system according to claim 5, wherein the controller controls the adjustment device according to progress of the processing.

8. The processing system according to claim 5, wherein the controller controls the adjustment device so that a liquid surface of the liquid supplied to the container is maintained at a position higher than the predetermined top surface.

9. The processing system according to claim 8, wherein the liquid processing device has a suction port which can remove the liquid.

10. The processing system according to claim 9, wherein the suction port is arranged so that removal of the liquid is performed above the target portion.

11. The processing system according to claim 2, wherein processing of the liquid includes supply of gas.

12. The processing system according to claim 11, wherein the liquid processing device has a gas supply port which supplies the gas from above the target portion.

13. The processing system according to claim 11, wherein the gas is an inert gas.

14. The processing system according to claim 2, wherein the liquid processing device limits the liquid supplied from entering a predetermined space that includes an optical path of the beam.

15. The processing system according to claim 2, wherein
the processing is a shaping processing in which a three-dimensional shaped object consisting of stacking a plurality of layers based on 3D data of a three-dimensional shaped object subject to shaping, and
the predetermined top surface is an object surface of shaping in which the target portion is set.

16. The processing system according to claim 15, further comprising:
a material supplying section which supplies powder as a shaping material, wherein
the beam and the object surface are relatively moved based on the 3D data so that shaping processing is applied to the target portion, and concurrently, irradiation of the beam and supply of the shaping material are performed on the target portion.

17. The processing system according to claim 2, further comprising:
a cover member which surrounds at least a part of an optical path of the beam; and
a material supplying section which supplies powder as a shaping material, wherein
the processing is a shaping processing in which a three-dimensional shaped object consisting of stacking a plurality of layers based on 3D data of a three-dimensional shaped object subject to shaping,
the predetermined top surface is an object surface of shaping in which the target portion is set,
the beam and the object surface are relatively moved based on the 3D data and concurrently, irradiation of the beam and supply of the shaping material are performed on the target portion, so that shaping processing is applied to the target portion, and
the cover member has an outlet through which the beam and the shaping material pass.

18. The processing system according to claim 2, wherein the processing is a processing in which a workpiece is processed by irradiating a beam on the workpiece having the predetermined top surface.

19. The processing system according to claim 18, wherein the processing includes a removal processing.

20. The processing system according to claim 2, wherein the processing is performed by irradiating a beam on the target portion, while liquid supply to an object having the predetermined top surface is performed by the liquid supply device.

21. The processing system according to claim 2, wherein one of temperature adjustment of an object having the predetermined top surface and cooling of an object having the predetermined top surface is performed by the supply of the liquid.

22. The processing system according to claim 2, wherein the beam irradiation section has an optical system and irradiates the beam via the optical system.

23. The processing system according to claim 22, wherein
the shaping material is supplied to the target portion along an optical axis of the optical system, and
the beam is irradiated on the target portion from a direction tilted with respect to the optical axis.

24. The processing system according to claim 22, wherein
the optical system is a condensing optical system having a terminal lens in which a through hole is formed in a center portion including an optical axis, the through hole penetrating in a direction parallel to the optical axis, and
the shaping material is supplied to the target portion via a material supplying port provided at one end of a supply pipe arranged within the through hole.

25. The processing system according to claim 22, wherein
the shaping material is supplied to the target portion along a direction tilted with respect to an optical axis of the optical system, and
the beam is irradiated on the target portion along the optical axis.

26. The processing system according to claim 2, wherein the processing includes a removal processing.

27. The processing system according to claim 2, wherein the beam and a workpiece are relatively moved so that processing is applied to the target portion on the workpiece.

28. The processing system according to claim 2, further comprising:
a cover member having an outlet through which the beam passes, along with surrounding at least a part of an optical path of the beam.

29. The processing system according to claim 28, wherein the liquid processing device processes the liquid using the cover member.

30. The processing system according to claim 29, wherein the cover member has a gas supplying port.

31. The processing system according to claim 30, wherein the liquid processing device supplies gas from the gas supplying port, via the outlet of the cover member.

32. The processing system according to claim 30, wherein the cover member has the gas supplying port around the outlet.

33. The processing system according to claim 32, wherein the gas supplying port is arranged facing the predetermined surface.

34. The processing system according to claim 30, wherein gas from the gas supplying port is an inert gas.

35. The processing system according to claim 28, wherein the cover member has a suction port which can remove the liquid.

36. The processing system according to claim 35, wherein the cover member has the suction port around the outlet.

37. The processing system according to claim 36, wherein the suction port is arranged facing the object surface.

38. The processing system according to claim 2, wherein the liquid covers at least a part of the predetermined top surface.

* * * * *